US012489859B2

United States Patent
Miyata et al.

(10) Patent No.: US 12,489,859 B2
(45) Date of Patent: Dec. 2, 2025

(54) INFORMATION PROCESSING APPARATUS, INFORMATION PROCESSING METHOD, PROGRAM, AND INFORMATION PROCESSING SYSTEM FOR GENERATING A VIRTUAL VIEWPOINT IMAGE

(71) Applicant: FUJIFILM Corporation, Tokyo (JP)

(72) Inventors: Masahiko Miyata, Saitama (JP); Yasunori Murakami, Saitama (JP); Takashi Aoki, Saitama (JP); Fuminori Irie, Saitama (JP); Kazunori Tamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 321 days.

(21) Appl. No.: 18/156,363

(22) Filed: Jan. 18, 2023

(65) Prior Publication Data
US 2023/0171371 A1    Jun. 1, 2023

Related U.S. Application Data

(63) Continuation of application No. PCT/JP2021/023651, filed on Jun. 22, 2021.

(30) Foreign Application Priority Data

Jul. 31, 2020    (JP) ................. 2020-131166

(51) Int. Cl.
*H04N 5/262*        (2006.01)
*H04N 23/661*       (2023.01)
(Continued)

(52) U.S. Cl.
CPC ......... *H04N 5/2628* (2013.01); *H04N 23/661* (2023.01); *H04N 23/69* (2023.01); *H04N 23/695* (2023.01); *H04N 23/90* (2023.01)

(58) Field of Classification Search
CPC .... H04N 5/2628; H04N 23/661; H04N 23/69; H04N 23/695; H04N 23/90; G06T 15/205
See application file for complete search history.

(56) References Cited

U.S. PATENT DOCUMENTS 7,286,689 B2 * 10/2007 Damera-Venkata ...... G06T 7/20
                                                       382/238
7,522,186 B2 *  4/2009 Arpa ....................... G06T 7/30
                                                       348/143
(Continued)

FOREIGN PATENT DOCUMENTS

JP    2005080015    3/2005
JP    2019036791    3/2019
(Continued)

OTHER PUBLICATIONS

"International Search Report (Form PCT/ISA/210) of PCT/JP2021/023651," mailed on Sep. 21, 2021, with English translation thereof, pp. 1-5.
(Continued)

*Primary Examiner* — Chiawei Chen
(74) *Attorney, Agent, or Firm* — JCIPRNET

(57) ABSTRACT

An information processing apparatus includes a processor capable of generating a virtual viewpoint image based on a plurality of captured images acquired by imaging with a plurality of imaging apparatuses, and a memory built in or connected to the processor. The processor generates a control signal for a control target imaging apparatus among the plurality of imaging apparatuses based on at least one of an instruction given from an outside regarding generation of the virtual viewpoint image or a subject.

22 Claims, 28 Drawing Sheets

(51) Int. Cl.
  *H04N 23/69* (2023.01)
  *H04N 23/695* (2023.01)
  *H04N 23/90* (2023.01)

(56) References Cited

U.S. PATENT DOCUMENTS

| | | | |
|---|---|---|---|
| 10,190,869 B2 | 1/2019 | Aoki et al. | |
| 10,754,423 B2* | 8/2020 | Kim | G02B 27/0093 |
| 11,006,089 B2 | 5/2021 | Arai | |
| 11,196,944 B2* | 12/2021 | Zavesky | G06F 3/013 |
| 2013/0038700 A1* | 2/2013 | Horita | G02B 7/36 |
| | | | 348/E13.005 |
| 2018/0184072 A1* | 6/2018 | Yoshimura | G06T 15/205 |
| 2018/0359458 A1* | 12/2018 | Iwakiri | G06T 15/205 |
| 2019/0051035 A1* | 2/2019 | Nishiyama | H04N 13/243 |
| 2019/0208231 A1* | 7/2019 | Kitasei | H04L 65/762 |
| 2019/0220039 A1* | 7/2019 | Wu | G05D 1/0676 |
| 2019/0278803 A1 | 9/2019 | Ota | |
| 2019/0349531 A1 | 11/2019 | Aizawa | |
| 2020/0202496 A1* | 6/2020 | Kokura | G06T 5/73 |
| 2020/0258196 A1* | 8/2020 | Kokura | G06T 3/4076 |
| 2020/0404162 A1* | 12/2020 | Uno | G03B 13/36 |
| 2021/0224322 A1 | 7/2021 | Ota | |
| 2022/0053148 A1* | 2/2022 | Zavesky | G06T 5/50 |

FOREIGN PATENT DOCUMENTS

| | | |
|---|---|---|
| JP | 2019068130 | 4/2019 |
| JP | 2019159593 | 9/2019 |
| JP | 2019159950 | 9/2019 |
| JP | 2019197348 | 11/2019 |
| WO | 2016088437 | 6/2016 |
| WO | 2019176713 | 9/2019 |

OTHER PUBLICATIONS

"Written Opinion of the International Searching Authority (Form PCT/ISA/237) of PCT/JP2021/023651," mailed on Sep. 21, 2021, with English translation thereof, pp. 1-8.

"Notice of Reasons for Refusal of Japan Counterpart Application", issued on Feb. 6, 2024, with English translation thereof, p. 1-p. 8.

"Notice of Reasons for Refusal of Japan Counterpart Application", issued on Sep. 2, 2025, with English translation thereof, p. 1-p. 5.

* cited by examiner

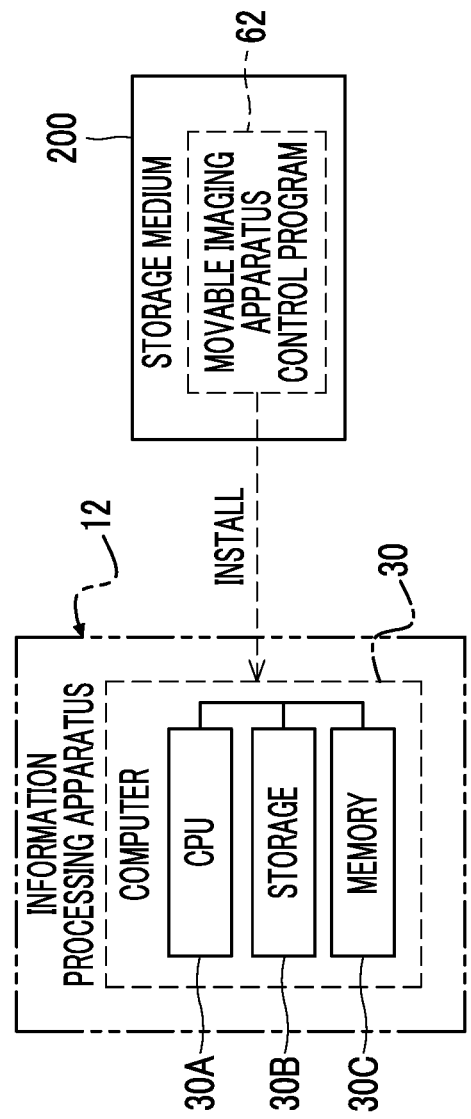

INFORMATION PROCESSING APPARATUS, INFORMATION PROCESSING METHOD, PROGRAM, AND INFORMATION PROCESSING SYSTEM FOR GENERATING A VIRTUAL VIEWPOINT IMAGE

CROSS-REFERENCE TO RELATED APPLICATIONS

This application is a continuation application of International Application No. PCT/JP2021/023651, filed Jun. 22, 2021, the disclosure of which is incorporated herein by reference in its entirety. Further, this application claims priority under 35 USC 119 from Japanese Patent Application No. 2020-131166 filed Jul. 31, 2020, the disclosure of which is incorporated by reference herein.

BACKGROUND

1. Technical Field

The technology of the present disclosure relates to an information processing apparatus, an information processing method, a program, and an information processing system.

2. Related Art

JP2019-159593A discloses an image search system comprising an accumulation unit, an input unit, an extraction unit, and a presentation unit. The accumulation unit accumulates virtual viewpoint video data generated based on image data obtained by capturing an object from a plurality of directions with a plurality of cameras and a virtual viewpoint parameter used to generate the virtual viewpoint video data in association with each other. The input unit inputs a search condition. The extraction unit extracts the virtual viewpoint video data associated with the virtual viewpoint parameter corresponding to the input search condition from the accumulation unit. The presentation unit presents information on the virtual viewpoint video data extracted by the extraction unit as a search result.

JP2019-068130A discloses a video distribution server that distributes a video stream to a client. The video distribution server includes a unit that generates an individual viewpoint stream based on a multi-viewpoint video, a unit that combines the multi-viewpoint videos to generate an all-viewpoint stream, a unit that decides a schedule for multicasting each video stream based on a request from each client, a unit that notifies the client of the decided schedule, and a unit that multicasts each video stream based on the decided schedule.

SUMMARY

An embodiment according to the technology of the present disclosure provides an information processing apparatus, an information processing method, program, and an information processing system capable of generating a virtual viewpoint image for a region selected in response to at least one of an instruction given from an outside or a subject.

A first aspect according to the technology of the present disclosure relates to an information processing apparatus comprising a processor capable of generating a virtual viewpoint image based on a plurality of captured images acquired by imaging with a plurality of imaging apparatuses, and a memory built in or connected to the processor, in which the processor generates a control signal for a control target imaging apparatus among the plurality of imaging apparatuses based on at least one of an instruction given from an outside regarding generation of the virtual viewpoint image or a subject.

A second aspect according to the technology of the present disclosure relates to the information processing apparatus according to the first aspect, in which the control signal is a signal related to control of causing the control target imaging apparatus to acquire the captured image used to generate a virtual viewpoint image satisfying a predetermined condition in response to the instruction.

A third aspect according to the technology of the present disclosure relates to the information processing apparatus according to the first or second aspect, in which the control signal is a signal related to control of causing the control target imaging apparatus to acquire the captured image used to generate a high-resolution virtual viewpoint image having a resolution equal to or higher than a predetermined value.

A fourth aspect according to the technology of the present disclosure relates to the information processing apparatus according to any one of the first to third aspects, in which the control signal is a signal related to control of changing an imaging range of the control target imaging apparatus.

A fifth aspect according to the technology of the present disclosure relates to the information processing apparatus according to any one of the first to fourth aspects, in which the control signal includes a position change signal for changing a position of the control target imaging apparatus.

A sixth aspect according to the technology of the present disclosure relates to the information processing apparatus according to any one of the first to fifth aspects, in which the control signal includes an imaging direction change signal for changing an imaging direction of the control target imaging apparatus.

A seventh aspect according to the technology of the present disclosure relates to the information processing apparatus according to any one of the first to sixth aspects, in which the control target imaging apparatus has an optical zoom function, and the control signal includes a focal length change signal for changing a focal length of the control target imaging apparatus.

An eighth aspect according to the technology of the present disclosure relates to the information processing apparatus according to any one of the first to seventh aspects, in which the control target imaging apparatus includes a change mechanism for changing a position, an imaging direction, a focal length, and an imaging condition of the control target imaging apparatus, and the change mechanism changes at least one of the position, the imaging direction, the focal length, or the imaging condition of the control target imaging apparatus in response to the control signal.

A ninth aspect according to the technology of the present disclosure relates to the information processing apparatus according to any one of the first to eighth aspects, in which the processor generates the control signal for causing the control target imaging apparatus to acquire the captured image used to generate a high-resolution virtual viewpoint image of a region that is predicted to have a high gaze degree based on a state of the subject among real space regions capable of being imaged by the plurality of imaging apparatuses.

A tenth aspect according to the technology of the present disclosure relates to the information processing apparatus according to any one of the first to ninth aspects, in which the instruction includes an instruction related to a high-resolution region which is a target for generating a high-resolution virtual viewpoint image.

An eleventh aspect according to the technology of the present disclosure relates to the information processing apparatus according to any one of the first to tenth aspects, in which, in a case in which information indicating a specific region among real space regions capable of being imaged by the plurality of imaging apparatuses is included in the instruction, the processor generates the control signal for causing the control target imaging apparatus to acquire the captured image used to generate a high-resolution virtual viewpoint image of the specific region.

A twelfth aspect according to the technology of the present disclosure relates to the information processing apparatus according to the tenth aspect, in which the high-resolution region is a region including a specific object included in real space regions capable of being imaged by the plurality of imaging apparatuses.

A thirteenth aspect according to the technology of the present disclosure relates to the information processing apparatus according to the tenth aspect, in which the high-resolution region is a region including a path of a gaze position with respect to the virtual viewpoint image.

A fourteenth aspect according to the technology of the present disclosure relates to the information processing apparatus according to the tenth aspect, in which the processor decides the high-resolution region based on a result of aggregating a plurality of the instructions, and generates the control signal for the control target imaging apparatus based on the decided high-resolution region.

A fifteenth aspect according to the technology of the present disclosure relates to the information processing apparatus according to the tenth aspect, in which the processor decides the high-resolution region based on a history of the instruction related to the high-resolution region, and generates the control signal for the control target imaging apparatus based on the decided high-resolution region.

A sixteenth aspect according to the technology of the present disclosure relates to the information processing apparatus according to the third aspect, in which the processor is capable of changing the resolution of the high-resolution virtual viewpoint image by changing a focal length of the control target imaging apparatus.

A seventeenth aspect according to the technology of the present disclosure relates to the information processing apparatus according to the third aspect, in which the processor predicts a high-resolution region in which the high-resolution virtual viewpoint image is capable of being generated among real space regions capable of being imaged by the plurality of imaging apparatuses based on a position, an imaging direction, and a focal length of the control target imaging apparatus, and outputs the predicted high-resolution region.

An eighteenth aspect according to the technology of the present disclosure relates to the information processing apparatus according to the seventeenth aspect, in which an output destination of the predicted high-resolution region is a display, and the di splay di splays the high-resolution region output from the processor.

A nineteenth aspect according to the technology of the present disclosure relates to the information processing apparatus according to the seventeenth or eighteenth aspect, in which the processor performs control of displaying a relationship between the resolution of the high-resolution virtual viewpoint image which is changed with a change of the focal length in the predicted high-resolution region and a size of the high-resolution region on a display in a visually distinguishable manner.

A twentieth aspect according to the technology of the present disclosure relates to the information processing apparatus according to any one of the seventeenth to nineteenth aspects, in which the processor performs control of displaying an object included in the predicted high-resolution region on a display in a visually distinguishable manner from other objects.

A twenty-first aspect according to the technology of the present disclosure relates to the information processing apparatus according to any one of the seventeenth to twentieth aspects, in which the processor stores a reference image obtained by causing the control target imaging apparatus to image a fixed object included in a real space region capable of being imaged by the imaging apparatus at a reference position, a reference imaging direction, and a reference focal length in the memory in advance, compares a calibration image obtained by causing the control target imaging apparatus to image the fixed object at the reference position, the reference imaging direction, and the reference focal length with the reference image, and calibrates the control signal based on a comparison result.

A twenty-second aspect according to the technology of the present disclosure relates to an information processing method capable of generating a virtual viewpoint image based on a plurality of captured images acquired by imaging with a plurality of imaging apparatuses, the method comprising generating a control signal for a control target imaging apparatus among the plurality of imaging apparatuses based on at least one of an instruction given from an outside regarding generation of the virtual viewpoint image or a subject.

A twenty-third aspect according to the technology of the present disclosure relates to a program causing a computer to execute information processing capable of generating a virtual viewpoint image based on a plurality of captured images acquired by imaging with a plurality of imaging apparatuses, the information processing comprising generating a control signal for a control target imaging apparatus among the plurality of imaging apparatuses based on at least one of an instruction given from an outside regarding generation of the virtual viewpoint image or a subject.

A twenty-fourth aspect according to the technology of the present disclosure relates to an information processing system comprising a plurality of imaging apparatuses, and the information processing apparatus according to any one of the first to twenty-first aspects.

BRIEF DESCRIPTION I/F THE DRAWINGS

Exemplary embodiments of the technology of the disclosure will be described in detail based on the following figures, wherein:

FIG. 28 is a block diagram showing an example of an aspect in which a movable imaging apparatus control program is installed from a storage medium to a computer of the information processing apparatus.

DETAILED DESCRIPTION

Figure 1:
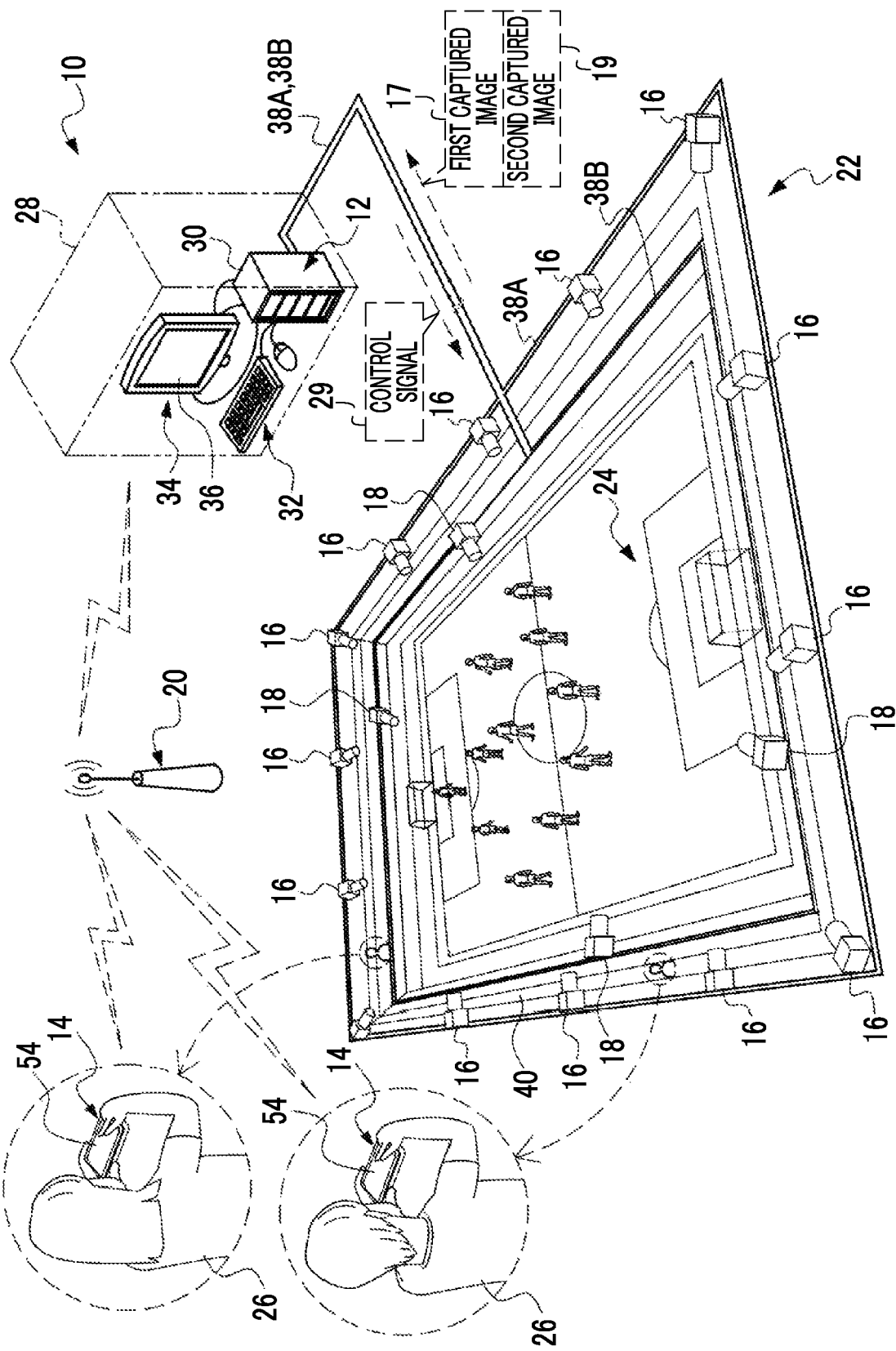
FIG. 1 is a schematic perspective diagram showing an example of an external configuration of an information processing system.

An example of embodiments of an information processing apparatus, an information processing method, a program, and an information processing system according to the technology of the present disclosure will be described with reference to the accompanying drawings.

First, the terms used in the following description will be described.

CPU refers to an abbreviation of "Central Processing Unit". RAM refers to an abbreviation of "Random Access Memory". SSD refers to an abbreviation of "Solid State Drive". HDD refers to an abbreviation of "Hard Disk Drive". EEPROM refers to an abbreviation of "Electrically Erasable and Programmable Read Only Memory". I/F refers to an abbreviation of "Interface". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". CMOS refers to an abbreviation of "Complementary Metal Oxide Semiconductor". CCD refers to an abbreviation of "Charge Coupled Device". EL refers to an abbreviation of "Electro-Luminescence". GPU refers to an abbreviation of "Graphics Processing Unit". LAN refers to an abbreviation of "Local Area Network". 3D refers to an abbreviation of an abbreviation for "three (3) Dimensional". USB refers to an abbreviation of "Universal Serial Bus". GNSS refers to an abbreviation of "Global Navigation Satellite System". In the following, for convenience of description, a CPU is described as an example of a "processor" according to the technology of the present disclosure. However, the "processor" according to the technology of the present disclosure may be a combination of a plurality of processing apparatuses, such as a CPU and a GPU. In a case in which the combination of the CPU and the GPU is applied as an example of the "processor" according to the technology of the present disclosure, the GPU is operated under the control of the CPU and is responsible for executing the image processing.

In the following description, "match" refers to the match in the sense of including an error generally allowed in the technical field to which the technology of the present disclosure belongs, that is the error to the extent that it does not contradict the purpose of the technology of the present disclosure, in addition to the exact match. In addition, in the following description, "parallel" refers to the parallelism in the sense of including an error generally allowed in the technical field to which the technology of the present disclosure belongs, that is the error to the extent that it does not contradict the purpose of the technology of the present disclosure, in addition to the exact parallelism. In addition, in the following description, "the same time point" refers to the same time point in the sense of including an error generally allowed in the technical field to which the technology of the present disclosure belongs, that is the error to the extent that it does not contradict the purpose of the technology of the present disclosure, in addition to the exact same time point.

First Embodiment

For example, as shown in FIG. 1, an information processing system 10 comprises an information processing apparatus 12, a user device 14, a plurality of fixed imaging apparatuses 16, a movable imaging apparatus 18, and a wireless communication base station (hereinafter, simply referred to as "base station") 20. Here, the information processing system 10 is an example of an "information processing system" according to the technology of the present disclosure.

The fixed imaging apparatus 16 is a device for imaging which includes an imaging element. As the imaging element, a CMOS image sensor is adopted. It should be noted that another type of image sensor, such as a CCD image sensor, may be adopted instead of the CMOS image sensor.

The plurality of fixed imaging apparatuses 16 are installed in a soccer stadium 22. Each of the plurality of fixed imaging apparatuses 16 is disposed to surround a soccer field 24, and images a real space region including the soccer stadium 22 as an imaging region. A position, an imaging direction, a focal length, and an imaging condition of each fixed imaging apparatus 16 are fixed.

The movable imaging apparatus 18 is a device for imaging which including an imaging element 69 (see FIG. 8), and has an optical zoom function. As the imaging element 69, a CMOS image sensor is adopted. It should be noted that another type of image sensor, such as a CCD image sensor, may be adopted instead of the CMOS image sensor.

In the present embodiment, for example, four movable imaging apparatuses 18 are disposed one by one on each side of the soccer field 24 having a rectangular shape in a plan view, and each movable imaging apparatus 18 is movable along each side of the soccer field 24. A position, an imaging direction, a focal length, and an imaging condition of each movable imaging apparatus 18 can be changed. Here, the form example is described in which four movable imaging apparatuses 18 are disposed, but the technology of the present disclosure is not limited to this, and the number of movable imaging apparatuses 18 may be more than or less than four. In addition, although each movable imaging apparatus 18 is movable along each side of the soccer field 24 having a rectangular shape in a plan view, in the technology of the present disclosure, the disposition and the movable range of the movable imaging apparatus 18 are not particularly limited. In the following, in a case in which it is not necessary to distinguish between the fixed imaging apparatus 16 and the movable imaging apparatus 18, the fixed imaging apparatus 16 and the movable imaging apparatus 18 are simply referred to as an "imaging apparatus" without a reference numeral. The imaging apparatus is an example of an "imaging apparatus" according to the technology of the present disclosure.

The imaging with the imaging apparatus refers to, for example, imaging at an angle of view including the imaging range. Here, the concept of "imaging range" includes the concept of a range indicating a part of the soccer stadium 22, in addition to the concept of a range indicating the entire soccer stadium 22. The imaging range is changed in accordance with the position, the imaging direction, and the angle of view of the imaging apparatus.

The information processing apparatus 12 is installed in a control room 21. The information processing apparatus 12 comprises a computer 30, a reception device 32, and a display 34. The information processing apparatus 12 is connected to the fixed imaging apparatus 16 via a LAN cable 38A and is connected to the movable imaging apparatus 18 via a LAN cable 38B. It should be noted that, here, although the connection using a wired communication method by the LAN cables 38A and 38B is described as an example, the technology of the present disclosure is not limited to this, and the connection using a wireless communication method may be used. It should be noted that the information processing apparatus 12 is an example of an "information processing apparatus" according to the technology of the present disclosure.

The information processing apparatus 12 acquires a first captured image 17 obtained by imaging with the fixed imaging apparatus 16 and a second captured image 19 obtained by imaging with the movable imaging apparatus 18. In the following, in a case in which it is not necessary to distinguish between the first captured image 17 and the second captured image 19, the first captured image 17 and the second captured image 19 are simply referred to as a "captured image" without a reference numeral. It should be noted that the captured image is an example of a "captured image" according to the technology of the present disclosure.

In the soccer stadium 22, spectator seats 40 are provided to surround the soccer field 24, and a viewer 26 sits in the spectator seat 40. The viewer 26 owns the user device 14, and the user device 14 is used by the viewer 26. It should be noted that, here, the form example is described in which the viewer 26 is present in the soccer stadium 22, but the technology of the present disclosure is not limited to this, and the viewer 26 may be present outside the soccer stadium 22.

The user device 14 is a smartphone. It should be noted that the smartphone is merely an example of the user device 14, and may be, for example, a portable multifunctional terminal, such as a tablet terminal, a laptop computer, or a head-mounted display.

The base station 20 transmits and receives various information to and from the information processing apparatus 12 and the user device 14 via radio waves. That is, the information processing apparatus 12 is connected to the user device 14 via the base station 20 in a wirelessly communicable manner. The information processing apparatus 12 transmits various images to the user device 14 via the base station 20. The user device 14 receives various images transmitted from the information processing apparatus 12 to display the received various images on a display 54.

The information processing apparatus 12 is a device corresponding to a server, and the user device 14 is a device corresponding to a client terminal with respect to the information processing apparatus 12. By the information processing apparatus 12 and the user device 14 wirelessly communicating with each other via the base station 20, the user device 14 requests the information processing apparatus 12 to provide various services, and the information processing apparatus 12 provides the services to the user device 14 in response to the request from the user device 14.

The information processing apparatus 12 generates a virtual viewpoint image based on a plurality of captured images acquired by imaging with a plurality of imaging apparatuses. The virtual viewpoint image is a 3D polygon image generated based on the plurality of captured images, and is a virtual image in a case in which a gaze position is observed from a virtual viewpoint position. The gaze position is a position in the real space region in the soccer stadium 22 in which a degree of interest from the viewer 26 who uses the user device 14 is higher than a reference level, and examples thereof include a position of a specific object including a player, a ball, or a goal. Here, the reference level may be a fixed value obtained in advance by a test using an actual machine and/or a computer simulation, or may be a variable value that varies in response to an instruction given from the outside or a predetermined condition. It should be noted that the virtual viewpoint image is an example of a "virtual viewpoint image" according to the technology of the present disclosure.

In addition, the information processing apparatus 12 generates a control signal 29 for the movable imaging apparatus 18 based on the instruction given from the outside regarding the generation of the virtual viewpoint image. The control signal 29 is a signal related to control of causing the movable imaging apparatus 18 to acquire the second captured image 19 used to generate the virtual viewpoint image satisfying a predetermined condition in response to the instruction. Here, the "virtual viewpoint image satisfying a predetermined condition" is, for example, a virtual viewpoint image having a resolution equal to or higher than a predetermined value or a virtual viewpoint image in a case in which the gaze position is observed from a specific viewpoint. It should be noted that the movable imaging apparatus 18 is an example of a "control target imaging apparatus" according to the technology of the present disclosure. In addition, the control signal 29 is an example of a "control signal" according to the technology of the present disclosure.

Figure 2:
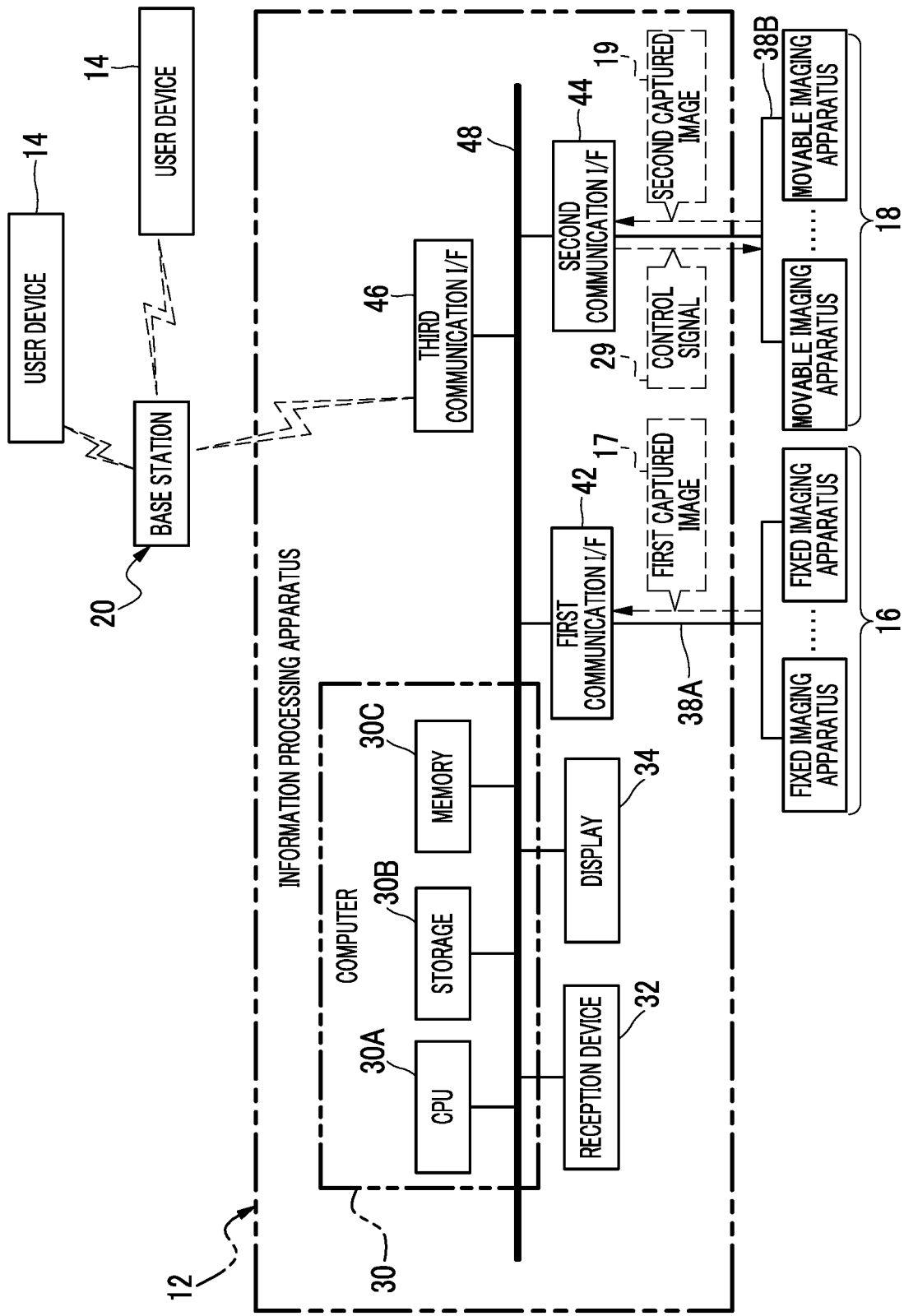
FIG. 2 is a block diagram showing an example of a hardware configuration of an electric system of an information processing apparatus and an example of a relationship between the information processing apparatus and peripheral devices thereof.

For example, as shown in FIG. 2, the information processing apparatus 12 comprises the computer 30, the reception device 32, the display 34, a first communication I/F 42, a second communication I/F 44, and a third communication I/F 46. The computer 30 comprises a CPU 30A, a storage 30B, and a memory 30C, and the CPU 30A, the storage 30B, and the memory 30C are connected to each other via a bus 48. In the example shown in FIG. 2, one bus is shown as the bus 48 for convenience of illustration, but a plurality of buses may be used. In addition, the bus 48 may include a serial bus or a parallel bus configured by a data bus, an address bus, a control bus, and the like.

The CPU 30A controls the entire information processing apparatus 12. Various parameters and various programs are stored in the storage 30B. The storage 30B is a non-volatile storage device. Here, an EEPROM, an SSD, and an HDD are adopted as an example of the storage 30B, but the technology of the present disclosure is not limited to this, and a combination of a plurality of these non-volatile storage devices may be used. The memory 30C is a storage device. Various information are transitorily stored in the memory 30C. The memory 30C is used as a work memory by the CPU 30A. Here, an RAM is adopted as an example of the memory 30C, but the technology of the present disclosure is not limited to this, and another type of storage device may be used. It should be noted that the CPU 30A is an example of a "processor" according to the technology of the present disclosure. In addition, the memory 30C is an example of a "memory" according to the technology of the present disclosure.

The reception device 32 receives an instruction from a manager (not shown) who manages the information processing apparatus 12. Examples of the reception device 32 include a keyboard, a touch panel, and a mouse. The reception device 32 is connected to the bus 48 and the like, and the CPU 30A acquires the instruction received by the reception device 32.

The display 34 is an example of a "display" according to the technology of the present disclosure. The display 34 is connected to the bus 48 and displays various information under the control of the CPU 30A. Examples of the display 34 include a liquid crystal display. It should be noted that another type of display, such as an EL display (for example, an organic EL display or an inorganic EL display), may be adopted as the display 34 without being limited to the liquid crystal display.

The first communication I/F 42 is connected to the LAN cable 38A. The first communication I/F 42 is realized by a device including an FPGA, for example. The first communication I/F 42 is connected to the bus 48, and controls the exchange of various information between the CPU 30A and the fixed imaging apparatus 16. For example, the first communication I/F 42 receives the first captured image 17 obtained by imaging with the fixed imaging apparatus 16, and outputs the received first captured image 17 to the CPU 30A. It should be noted that, here, although the wired communication I/F is described as an example of the first communication I/F 42, a wireless communication I/F, such as a high-speed wireless LAN, may be used.

The second communication I/F 44 is connected to the LAN cable 38B. The second communication I/F 44 is realized by a device including an FPGA, for example. The second communication I/F 44 is connected to the bus 48 and controls the exchange of various information between the CPU 30A and the movable imaging apparatus 18. For example, the second communication I/F 44 transmits the control signal 29 to the movable imaging apparatus 18 in response to the request of the CPU 30A. In addition, the second communication I/F 44 receives the second captured image 19 obtained by imaging with the movable imaging apparatus 18, and outputs the received second captured image 19 to the CPU 30A. It should be noted that, here, although the wired communication I/F is described as an example of the second communication I/F 44, a wireless communication I/F, such as a high-speed wireless LAN, may be used.

The third communication I/F 46 is connected to the base station 20 in a wirelessly communicable manner. The third communication I/F 46 is realized by a device including an FPGA, for example. The third communication I/F 46 is connected to the bus 48. The third communication I/F 46 controls the exchange of various information between the CPU 30A and the user device 14 via the base station 20 by a wireless communication method. It should be noted that at least one of the first communication I/F 42, the second communication I/F 44, or the third communication I/F 46 can be configured by a fixed circuit instead of an FPGA. In addition, at least one of the first communication I/F 42, the second communication I/F 44, or the third communication I/F 46 may be a circuit configured by an ASIC, an FPGA, and/or a PLD.

Figure 3:
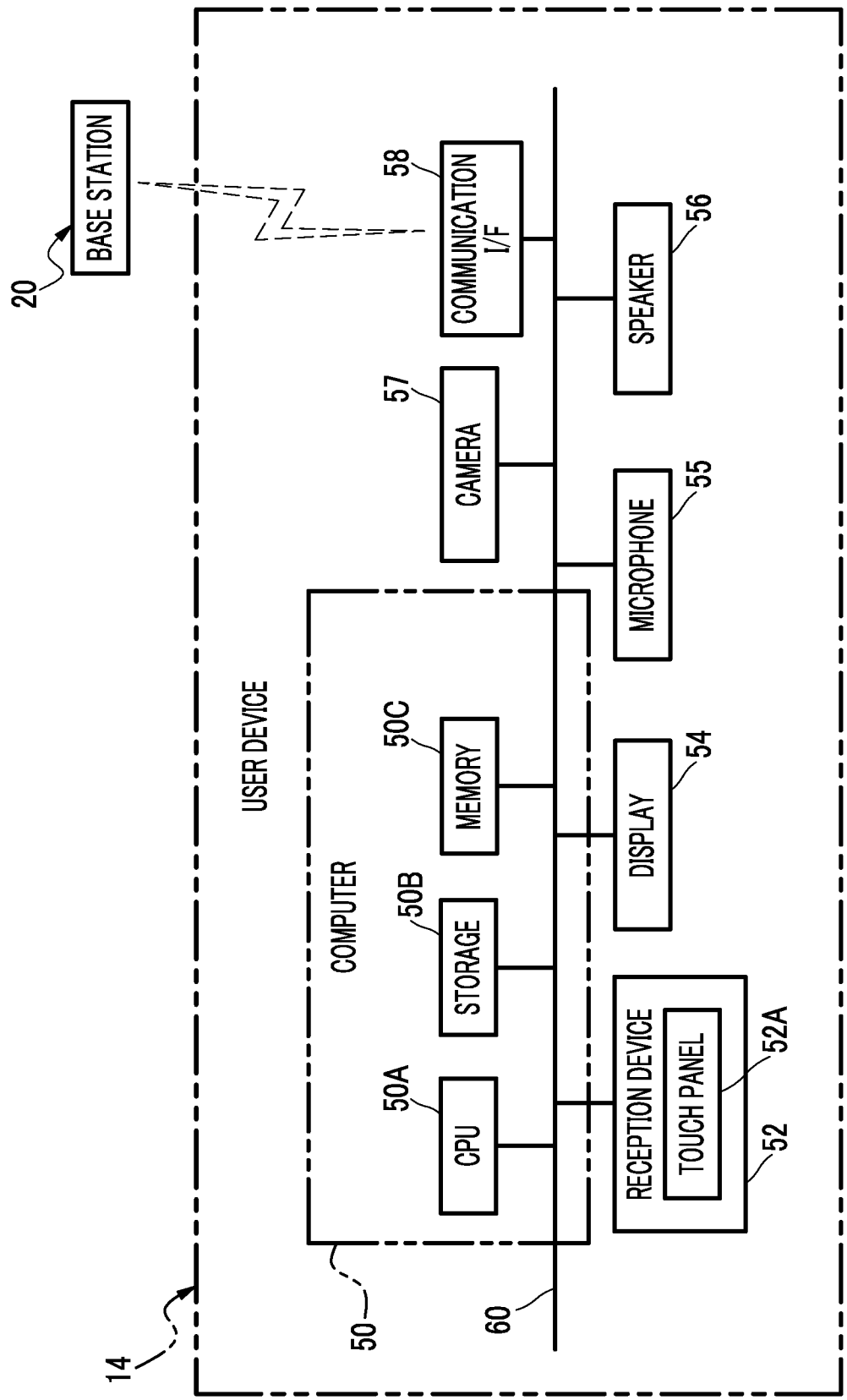
FIG. 3 is a block diagram showing an example of a hardware configuration of an electric system of a user device.

As shown in FIG. 3 as an example, the user device 14 comprises a computer 50, a reception device 52, the display 54, a microphone 55, a speaker 56, a camera 57, and a communication I/F 58. The computer 50 comprises a CPU 50A, a storage 50B, and a memory 50C, and the CPU 50A, the storage 50B, and the memory 50C are connected to each other via a bus 60. In the example shown in FIG. 3, one bus is shown as the bus 60 for convenience of illustration, but the bus 60 may be a plurality of buses. The bus 60 may be a serial bus, or may be a parallel bus including a data bus, an address bus, a control bus, and the like. It should be noted that, in the example shown in FIG. 3, the CPU 50A, the reception device 52, the display 54, the microphone 55, the speaker 56, the camera 57, and the communication I/F 58 are connected by a common bus, but the CPU 50A and each device may be connected by a dedicated bus or a dedicated communication line.

The CPU 50A controls the entire user device 14. Various parameters and various programs are stored in the storage 50B. The storage 50B is a non-volatile storage device. Here, a flash memory is adopted as an example of the storage 50B. The flash memory is merely an example, and examples of the storage 50B include various non-volatile memories, such as a magnetoresistive memory and/or a ferroelectric memory instead of the flash memory or in combination with the flash memory. In addition, the non-volatile storage device may be an EEPROM, an HDD, and/or an SSD. The memory 50C transitorily stores various information, and is used as a work memory by the CPU 50A. Examples of the memory 50C include a RAM, but the technology of the present disclosure is not limited to this, and other types of storage devices may be used.

The reception device 52 receives the instruction from the viewer 26. Examples of the reception device 52 include a touch panel 52A and a hard key. The reception device 52 is connected to the bus 60, and the CPU 50A acquires the instruction received by the reception device 52.

The display 54 is connected to the bus 60 and displays various information under the control of the CPU 50A. Here, an organic EL display is adopted as an example of the display 54. It should be noted that the display is not limited to the organic EL display, and another type of display, such as a liquid crystal display or an inorganic EL display, may be adopted as the display 54. It should be noted that the display 54 is an example of a "display" according to the technology of the present disclosure.

The user device 14 comprises a touch panel display, and the touch panel display is realized by the touch panel 52A and the display 54. That is, the touch panel display is formed by superimposing the touch panel 52A on a display region of the display 54 or by building a touch panel function in the display 54 ("in-cell" type). It should be noted that the "in-cell" type touch panel display is merely an example, and an "out-cell" type or an "on-cell" type touch panel display may be used.

The microphone 55 converts a collected sound into an electric signal. The microphone 55 is connected to the bus 60. The CPU 50A acquires the electric signal obtained by converting the sound collected by the microphone 55 via the bus 60.

The speaker 56 converts the electric signal into the sound. The speaker 56 is connected to the bus 60. The speaker 56 receives the electric signal output from the CPU 50A via the bus 60, converts the received electric signal into the sound, and outputs the sound obtained by the conversion from the electric signal to the outside of the user device 14. Here, the speaker 56 is integrated with the user device 14, but the sound output from a separate headphone connected to the user device 14 by wire or wirelessly may be adopted. It should be noted that the headphone also includes an earphone.

The camera 57 acquires an image showing a subject by imaging the subject. The camera 57 is connected to the bus 60. The image obtained by imaging the subject by the camera 57 is acquired by the CPU 50A via the bus 60.

The communication I/F 58 is connected to the base station 20 in a wirelessly communicable manner. The communication I/F 58 is realized by, for example, a device configured by a circuit (for example, an ASIC, an FPGA, and/or a PLD). The communication I/F 58 is connected to the bus 60. The communication I/F 58 controls the exchange of various information between the CPU 50A and an external device via the base station 20 by a wireless communication method. Here, examples of the "external device" include the information processing apparatus 12.

Figure 4:
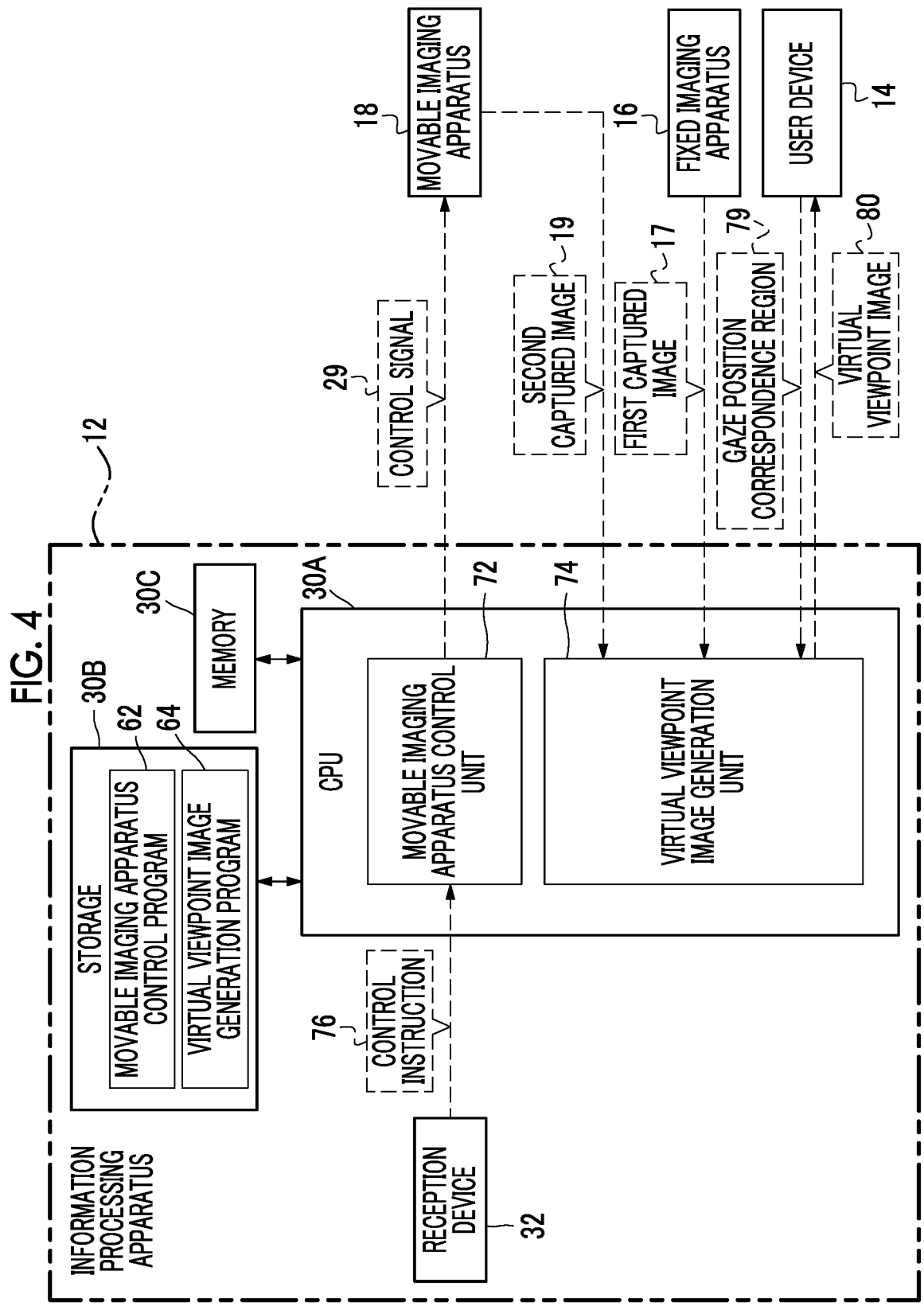
FIG. 4 is a block diagram showing an example of a function of a main part of the information processing apparatus.

As shown in FIG. 4 as an example, in the information processing apparatus 12, a movable imaging apparatus control program 62 and a virtual viewpoint image generation program 64 are stored in the storage 30B. The movable imaging apparatus control program 62 is a program causing the computer 30 to execute processing, and is an example of a "program" according to the technology of the present disclosure. In addition, the computer 30 is an example of a "computer" according to the technology of the present disclosure.

The CPU 30A reads out the movable imaging apparatus control program 62 from the storage 30B, and executes the read out movable imaging apparatus control program 62 on the memory 30C. The CPU 30A is operated as a movable imaging apparatus control unit 72 in accordance with the movable imaging apparatus control program 62 executed on the memory 30C to perform movable imaging apparatus control processing of controlling an imaging range 71 (see FIG. 5) of the movable imaging apparatus 18. In addition, the CPU 30A reads out the virtual viewpoint image generation program 64 from the storage 30B, and executes the read out virtual viewpoint image generation program 64 on the memory 30C. The CPU 30A is operated as a virtual viewpoint image generation unit 74 in accordance with the virtual viewpoint image generation program 64 executed on the memory 30C to perform virtual viewpoint image generation processing of generating the virtual viewpoint image.

The movable imaging apparatus control unit 72 receives a control instruction 76 from the reception device 32. In the first embodiment, the control instruction 76 is an instruction related to the imaging range 71 (see FIG. 5) of the movable imaging apparatus 18. The control instruction 76 is input from the reception device 32 by, for example, the manager. The control instruction 76 is an example of an "instruction" according to the technology of the present disclosure. The movable imaging apparatus control unit 72 generates the control signal 29 based on the received control instruction 76. The control signal 29 is a signal related to control of changing the imaging range 71 of the movable imaging apparatus 18.

The virtual viewpoint image generation unit 74 receives the second captured image 19 from the movable imaging apparatus 18. In addition, the virtual viewpoint image generation unit 74 receives the first captured image 17 from the fixed imaging apparatus 16. The virtual viewpoint image generation unit 74 uses the received captured image to generate a virtual viewpoint image 80 based on a gaze position correspondence region 79 indicating the gaze position. The virtual viewpoint image generation unit 74 transmits the generated virtual viewpoint image 80 to the user device 14.

Figure 5:
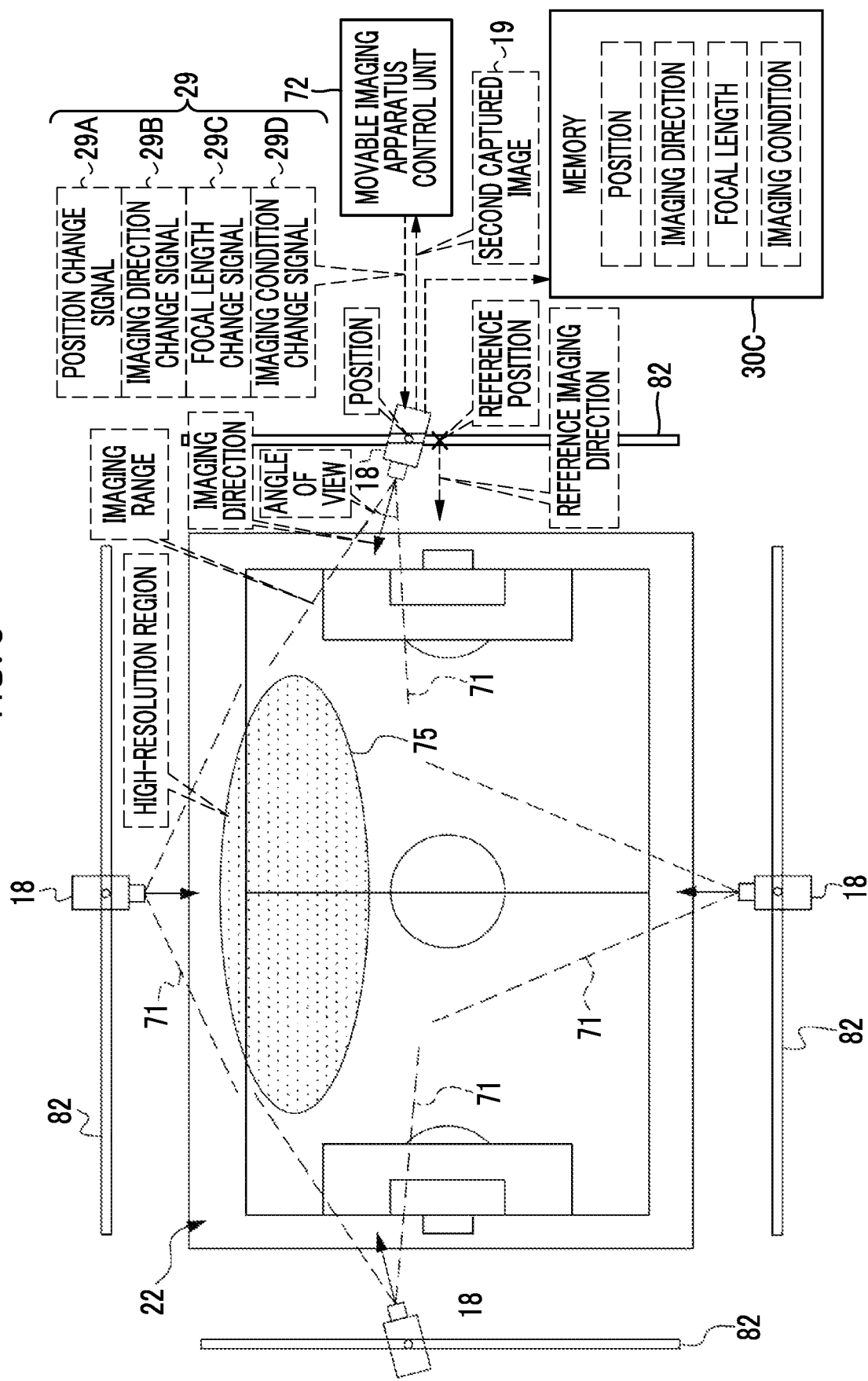
FIG. 5 is a conceptual diagram showing an example of a position, an imaging direction, and an angle of view of a movable imaging apparatus, and a high-resolution region.

With reference to FIG. 5, an example of the movable imaging apparatus control processing performed by the movable imaging apparatus control unit 72 will be described. The control signal 29 transmitted from the movable imaging apparatus control unit 72 includes a position change signal 29A, an imaging direction change signal 29B, a focal length change signal 29C, and an imaging condition change signal 29D. The position change signal 29A is a signal for changing the position of the movable imaging apparatus 18. The imaging direction change signal 29B is a signal for changing the imaging direction by the movable imaging apparatus 18. The focal length change signal 29C is a signal for changing the focal length of the movable imaging apparatus 18. The imaging condition change signal 29D is a signal for changing the imaging condition including a shutter speed, an F number, a sensitivity, and the like of the movable imaging apparatus 18. It should be noted that the position change signal 29A is an example of a "position change signal" according to the technology of the present disclosure. In addition, the imaging direction change signal 29B is an example of an "imaging direction change signal" according to the technology of the present disclosure. In addition, the focal length change signal 29C is an example of a "focal length change signal" according to the technology of the present disclosure. It should be noted that the control signal 29 does not have to include all of the position change signal 29A, the imaging direction change signal 29B, the focal length change signal 29C, and the imaging condition change signal 29D, and need only include at least any one of the position change signal 29A, the imaging direction change signal 29B, the focal length change signal 29C, or the imaging condition change signal 29D.

Four slide bars 82 are provided along four sides of the soccer stadium 22 in the soccer stadium 22 having a substantially rectangular shape in a plan view. Each slide bar 82 extends in parallel with each side of the soccer stadium 22. Each movable imaging apparatus 18 is disposed on each slide bar 82. The movable imaging apparatus control unit 72 transmits the position change signal 29A to the movable imaging apparatus 18 to change the position of the movable imaging apparatus 18 on the slide bar 82. In a case in which the center of each slide bar 82 is set as a reference position, the position of each movable imaging apparatus 18 is indicated by a positive or negative value with the reference position as an origin.

Figure 8:
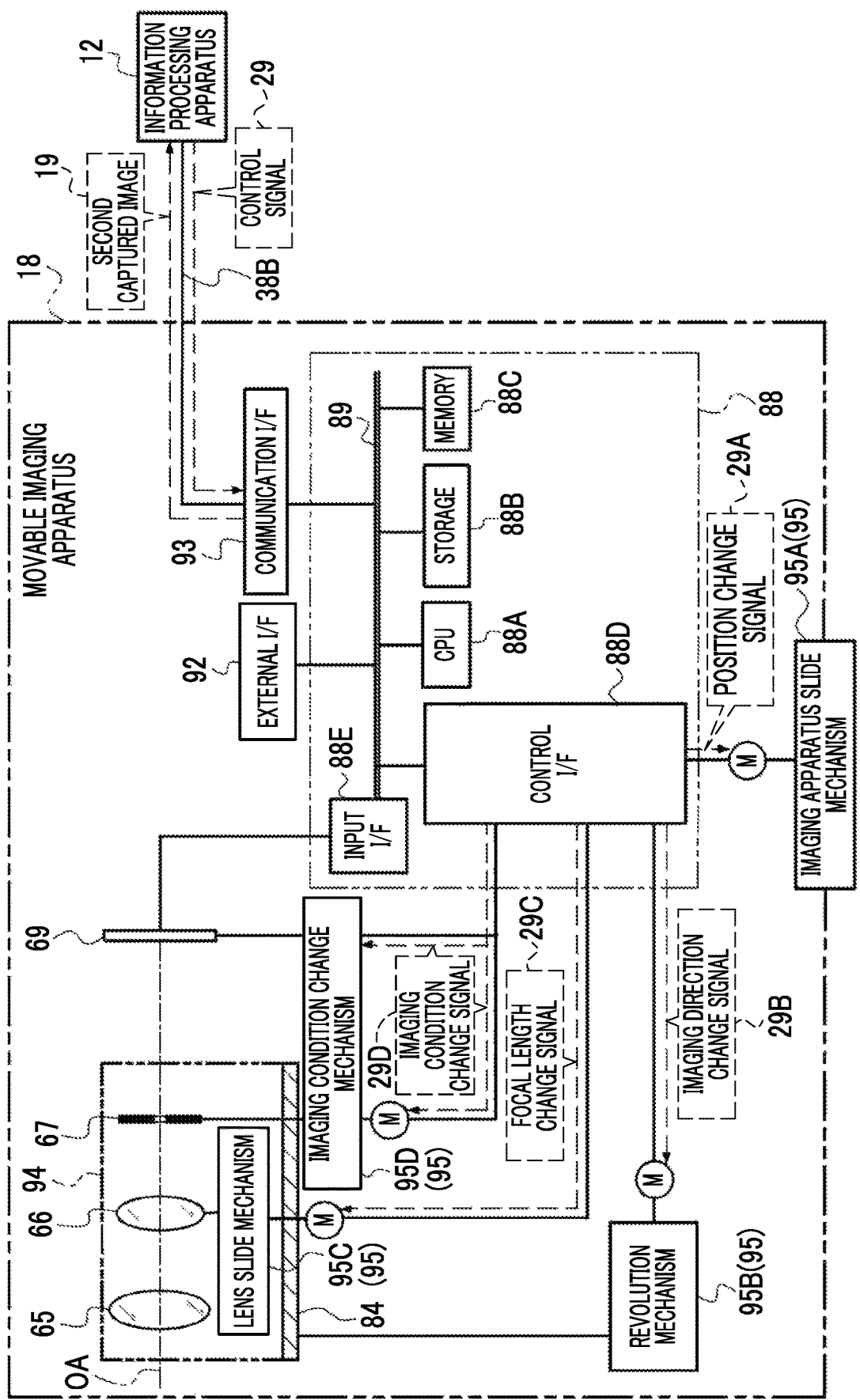
FIG. 8 is a block diagram showing an example of a hardware configuration of an electric system of the movable imaging apparatus.

In addition, the movable imaging apparatus 18 comprises a revolution table 84 that revolves a lens barrel 94 of the movable imaging apparatus 18 around a pan axis and a tilt axis (see FIG. 8). The movable imaging apparatus control unit 72 transmits the imaging direction change signal 29B to each movable imaging apparatus 18 to operate the revolution table 84 provided in the movable imaging apparatus 18. As a result, the imaging direction of the movable imaging apparatus 18 is changed. In a case in which a direction perpendicular to each slide bar 82 is set as a reference imaging direction, the imaging direction of each movable imaging apparatus 18 is indicated by a positive or negative angle formed with the reference imaging direction.

In addition, the movable imaging apparatus 18 has an optical zoom function. The movable imaging apparatus control unit 72 transmits the focal length change signal 29C to the movable imaging apparatus 18, and the movable imaging apparatus 18 receives the focal length change signal 29C from the movable imaging apparatus control unit 72. The movable imaging apparatus 18 activates the optical zoom function in response to the received focal length change signal 29C. That is, the movable imaging apparatus 18 changes the focal length in response to the focal length change signal 29C. The focal length of each movable imaging apparatus 18 is indicated by a positive or negative value with a predetermined reference focal length as an origin. As a result, the angle of view of the movable imaging apparatus 18 is changed.

In addition, the movable imaging apparatus control unit 72 transmits the imaging condition change signal 29D to the movable imaging apparatus 18 to change the imaging condition of the movable imaging apparatus 18.

The position, the imaging direction, the focal length, and the imaging condition of each movable imaging apparatus 18 are stored in the memory 30C, and the position, the imaging direction, the focal length, and the imaging condition in the memory 30C are updated each time the movable imaging apparatus control unit 72 generates the control signal 29. The imaging range 71 of the movable imaging apparatus 18 is decided by the position, the imaging direction, and the angle of view of the movable imaging apparatus 18. It should be noted that the imaging range 71 is an example of an "imaging range" according to the technology of the present disclosure.

The movable imaging apparatus control unit 72 derives a high-resolution region 75 (see FIG. 5) based on the second captured image 19 obtained by each movable imaging apparatus 18 imaging the imaging range 71. The high-resolution region 75 is a region in which the virtual viewpoint image having the resolution equal to or higher than the predetermined value (hereinafter, referred to as a "high-resolution virtual viewpoint image") can be generated. Here, the predetermined value is a fixed value derived as a lower limit value of the high resolution by a test using an actual machine and/or a computer simulation. The predetermined value may be a variable value, and the manager can change the predetermined value from a default value given at a time of shipment of the information processing apparatus. It should be noted that the high-resolution region 75 is an example of a "high-resolution region" according to the technology of the present disclosure.

An example of a derivation method of the high-resolution region 75 will be described below. The real space region in the soccer stadium 22 is represented by, for example, three-dimensional coordinates with the center of a center circle as an origin. For example, the movable imaging apparatus control unit 72 can associate each pixel in the image obtained by imaging the soccer stadium 22 with three-dimensional coordinates indicating the position within the real space region by using image recognition technology based on machine learning.

In the example shown in FIG. 5, the movable imaging apparatus control unit 72 extracts an image showing a high-contrast region having a contrast higher than a predetermined value (hereinafter, referred to as a "high-contrast region image") from each of four second captured images 19 obtained by imaging with four movable imaging apparatuses 18 at the same time point. Here, at least one high-contrast region image is extracted from each of the four second captured images 19 by the movable imaging apparatus control unit 72. The movable imaging apparatus control unit 72 acquires the three-dimensional coordinates of the corresponding real space region from each high-contrast region image by using the image recognition technology described above, and derives the logical sum of the three-dimensional coordinates of the real space region indicated by all the high-contrast region images as the high-resolution region 75. The high-resolution region 75 is a region indicating a part of the real space regions in the soccer stadium 22 indicated by three-dimensional coordinates.

Figure 6:
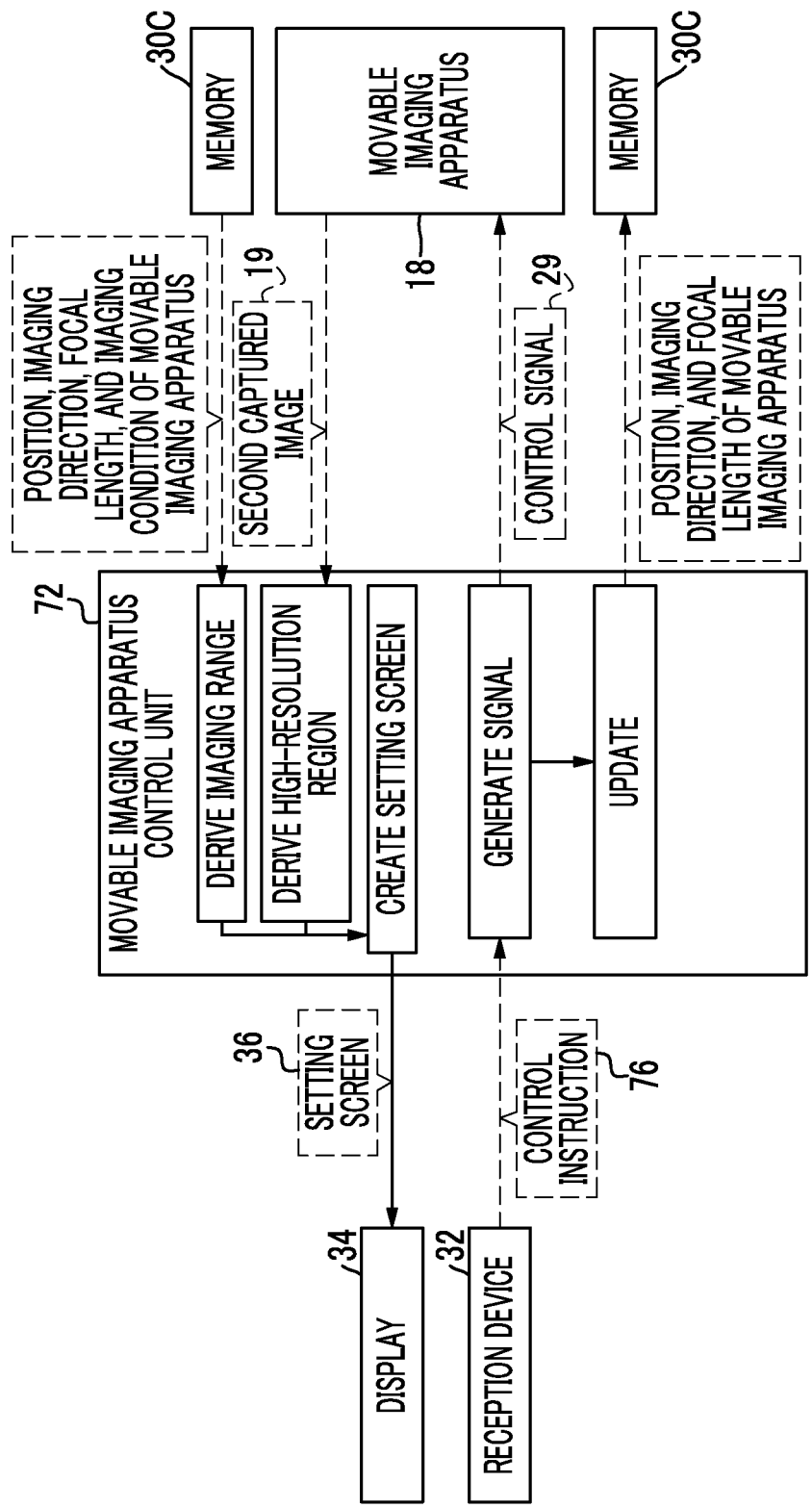
FIG. 6 is a block diagram showing an example of a function of a main part of a movable imaging apparatus control unit according to a first embodiment.

As shown in FIG. 6 as an example, the movable imaging apparatus control unit 72 acquires the position, the imaging direction, the focal length, and the imaging condition of each movable imaging apparatus 18 from the memory 30C. Further, the movable imaging apparatus control unit 72 acquires information related to a lens and an imaging element 69 (see FIG. 8) of each movable imaging apparatus 18 from the memory 30C. The movable imaging apparatus control unit 72 derives the angle of view of each movable imaging apparatus 18 from the information related to the imaging element 69 of each movable imaging apparatus 18 and the focal length. The movable imaging apparatus control unit 72 derives the imaging range 71 of each movable imaging apparatus 18 based on the position, the imaging direction, and the angle of view of each movable imaging apparatus 18.

In addition, the movable imaging apparatus control unit 72 acquires the second captured image 19 from the movable imaging apparatus 18, and derives the high-resolution region 75 based on the acquired second captured image 19. The movable imaging apparatus control unit 72 creates a setting screen 36 from the derived imaging range 71 and high-resolution region 75. The movable imaging apparatus control unit 72 outputs the created setting screen 36 to the display 34.

The movable imaging apparatus control unit 72 generates the control signal 29 for the movable imaging apparatus 18 based on the control instruction 76 received by the reception device 32. The movable imaging apparatus control unit 72 transmits the generated control signal 29 to the corresponding movable imaging apparatus 18. The movable imaging apparatus 18 receives the control signal 29 and changes the imaging range 71 in response to the received control signal 29. In addition, the movable imaging apparatus 18 may change the imaging condition in response to the received control signal 29. Based on the generated control signal 29, the movable imaging apparatus control unit 72 updates the position, the imaging direction, the focal length, and the imaging condition of the movable imaging apparatus 18 stored in the memory 30C.

Figure 7:
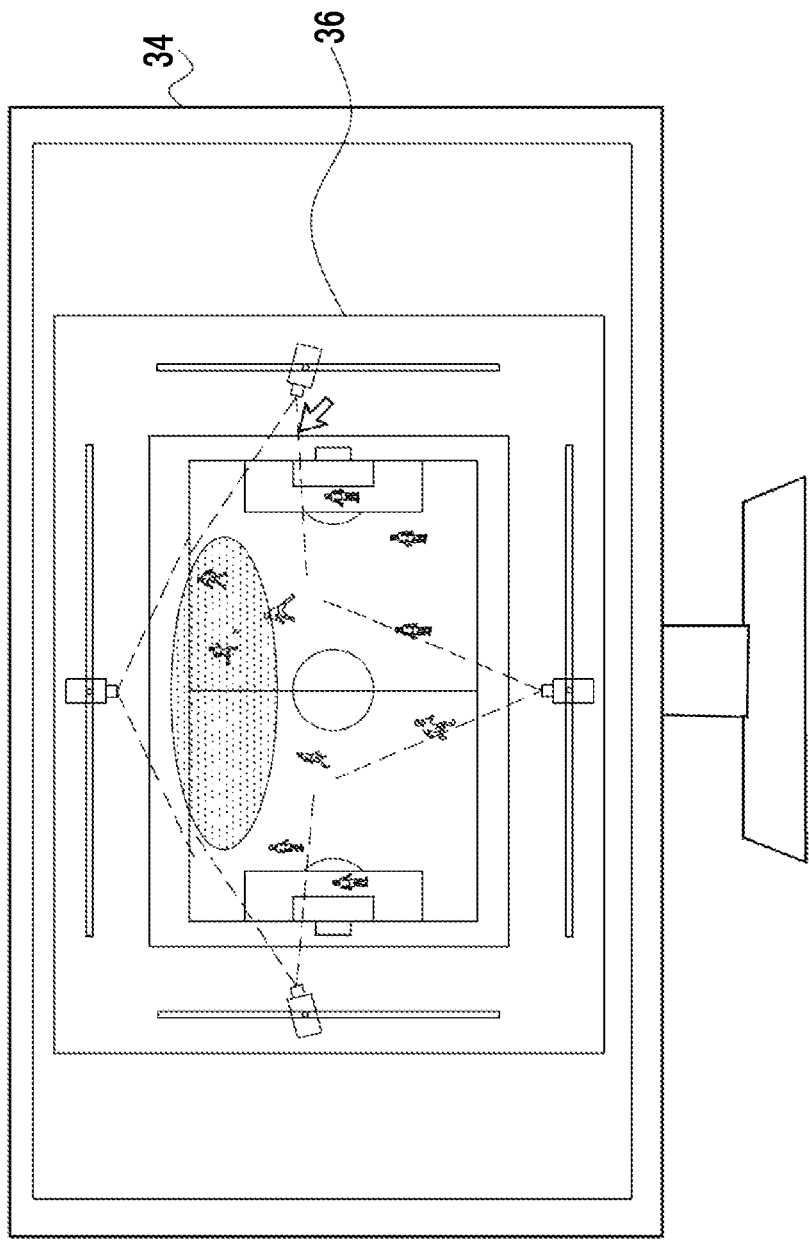
FIG. 7 is a conceptual diagram showing an example of a setting screen displayed on a display.

FIG. 7 shows an example of the setting screen 36. On the setting screen 36, for example, an image showing the position of the imaging range 71 of each movable imaging apparatus 18, an image showing the slide bar 82, and an image showing the high-resolution region 75 are displayed on a bird's-eye view image of the soccer stadium 22 obtained by imaging from the sky with the imaging apparatus mounted on an unmanned aerial vehicle (not shown) in a superimposed manner. It should be noted that the setting screen 36 may be output to the user device 14 and displayed on the display 54 of the user device 14.

For example, the manager of the information processing apparatus 12 outputs the control instruction 76 to the movable imaging apparatus control unit 72 by using the reception device 32 on the setting screen 36 displayed on the display 34. The control instruction 76 is, for example, an instruction to change the imaging range 71 of any one movable imaging apparatus 18 among the four movable imaging apparatuses 18. The control instruction 76 is output by the manager operating the mouse on the setting screen 36. For example, in a case in which the manager drags the image showing the position of the movable imaging apparatus 18 to another position along the image showing the slide bar 82 by operating the mouse, the control instruction 76 to move the movable imaging apparatus 18 to the corresponding position in the real space is output. Similarly, the control instruction 76 to change the imaging direction or the focal length of the movable imaging apparatus 18 may be output by performing a click, drag, or another operation on the image showing the position of the movable imaging apparatus 18. Alternatively, numerical values indicating the position, the imaging direction, and the angle of view of each movable imaging apparatus 18 are displayed on the setting screen 36, and the control instruction 76 may be output by the manager rewriting any of the numerical values by using the keyboard.

As shown in FIG. 8 as an example, the movable imaging apparatus 18 comprises the lens barrel 94, the imaging element 69, a controller 88, a change mechanism 95, an external I/F 92, and a communication I/F 93.

The lens barrel 94 comprises an objective lens 65, a focus lens 66, and a stop 67. The objective lens 65, the focus lens 66, and the stop 67 are disposed in the order of the objective lens 65, the focus lens 66, and the stop 67 along an optical axis OA from the subject side (object side) to the imaging element 69 side (image side). Subject light transmitted through the lens barrel 94 is imaged on a light-receiving surface of the imaging element 69.

The controller 88 controls the entire movable imaging apparatus 18. The controller 88 comprises a CPU 88A, a storage 88B, a memory 88C, a control I/F 88D, and an input I/F 88E. The CPU 88A, the storage 88B, the memory 88C, the control I/F 88D, and the input I/F 88E are connected to each other via a bus 89.

Examples of the storage 88B include an EEPROM. It should be noted that the EEPROM is merely an example. For example, a ferroelectric memory may be used instead of the EEPROM, and any memory may be used as long as it is a non-volatile memory that can be mounted on the movable imaging apparatus 18. The memory 88C is a volatile memory used as a work area or the like in a case in which various programs are executed. Various programs are stored in the storage 88B. The CPU 88A reads out various programs from the storage 88B and executes the read out programs on the memory 88C to collectively control the movable imaging apparatuses 18.

The input I/F 88E is connected to the imaging element 69. The input I/F 88E receives image data input from the imaging element 69. The controller 88 generates the image data indicating the second captured image 19 by performing known signal processing, such as white balance adjustment, sharpness adjustment, gamma correction, color space conversion processing, and color difference correction, on the image data.

The control I/F 88D is a device including an FPGA. The control I/F 88D is connected to the change mechanism 95 provided in the movable imaging apparatus 18. The control I/F 88D outputs the control signal 29 received from the information processing apparatus 12 to the change mechanism 95 to control the position, the imaging direction, the focal length, and the imaging condition of the movable imaging apparatus 18. It should be noted that the change mechanism 95 is an example of a "change mechanism" according to the technology of the present disclosure.

The change mechanism 95 is a mechanism for changing the position, the imaging direction, the focal length, and the imaging condition of the movable imaging apparatus 18. The change mechanism 95 changes at least one of the position, the imaging direction, the focal length, or the imaging condition of the movable imaging apparatus 18 in response to the control signal 29.

The change mechanism 95 includes an imaging apparatus slide mechanism 95A, a revolution mechanism 95B, a lens slide mechanism 95C, and an imaging condition change mechanism 95D. Each of the imaging apparatus slide mechanism 95A, the revolution mechanism 95B, the lens slide mechanism 95C, and the imaging condition change mechanism 95D is connected to the control I/F 88D via a motor.

The imaging apparatus slide mechanism 95A is attached to a body of the movable imaging apparatus 18. The motor connected to the imaging apparatus slide mechanism 95A is operated in response to the position change signal 29A input from the control I/F 88D. The imaging apparatus slide mechanism 95A is operated by receiving the power of the motor to move the movable imaging apparatus 18 along the slide bar 82.

The revolution mechanism 95B is attached to the revolution table 84 provided in the lens barrel 94. The motor connected to the revolution mechanism 95B is operated in response to the imaging direction change signal 29B input from the control I/F 88D. The revolution mechanism 95B is operated by receiving the power of the motor to selectively revolve the lens barrel 94 around the pan axis (not shown) and the tilt axis (not shown). It should be noted that the lens barrel 94 may be revolved around the pan axis and the tilt axis at the same time.

The lens slide mechanism 95C is attached to the focus lens 66. The motor connected to the lens slide mechanism 95C is operated in response to the focal length change signal 29C input from the control I/F 88D. The lens slide mechanism 95C is operated by receiving the power of the motor to move the focus lens 66 along the optical axis OA.

The imaging condition change mechanism 95D includes a stop change mechanism (not shown), a shutter speed change mechanism (not shown), and a sensitivity change mechanism (not shown). The stop change mechanism is attached to the stop 67 via the motor. The shutter speed change mechanism and the sensitivity change mechanism are attached to the imaging element 69. The motor connected to the stop change mechanism is operated in response to the imaging condition change signal 29D input from the control I/F 88D. The stop change mechanism is operated by receiving the power of the motor to change a size of an aperture of the stop 67. In addition, the shutter speed change mechanism changes the shutter speed of the imaging element 69 in response to the imaging condition change signal 29D input from the control I/F 88D. Further, the sensitivity change mechanism changes the sensitivity of the imaging element 69 in response to the imaging condition change signal 29D input from the control I/F 88D.

The external I/F 92 is connected to the bus 89. The external I/F 92 is a device including an FPGA. An external device (not shown), such as a USB memory or a memory card, is connected to the external I/F 92. The external I/F 92 controls the exchange of various information between the CPU 88A and the external device. The CPU 88A stores the second captured image data indicating the second captured image 19 in the external device via the external I/F 92.

In addition, the communication I/F 93 is connected to the bus 89. The communication I/F 93 is connected to the information processing apparatus 12 via, for example, the LAN cable 38B. The CPU 88A transmits the second captured image data to the information processing apparatus 12 via the communication I/F 93. In addition, the communication I/F may be a wireless communication I/F, in that case, the communication I/F is connected to the information processing apparatus 12 via a wireless radio wave.

It should be noted that, in the example shown in FIG. 8, one bus is shown as the bus 89 for convenience of illustration, but a plurality of buses may be used. The bus 89 may be a serial bus, or may be a parallel bus including a data bus, an address bus, a control bus, and the like.

Figure 9:
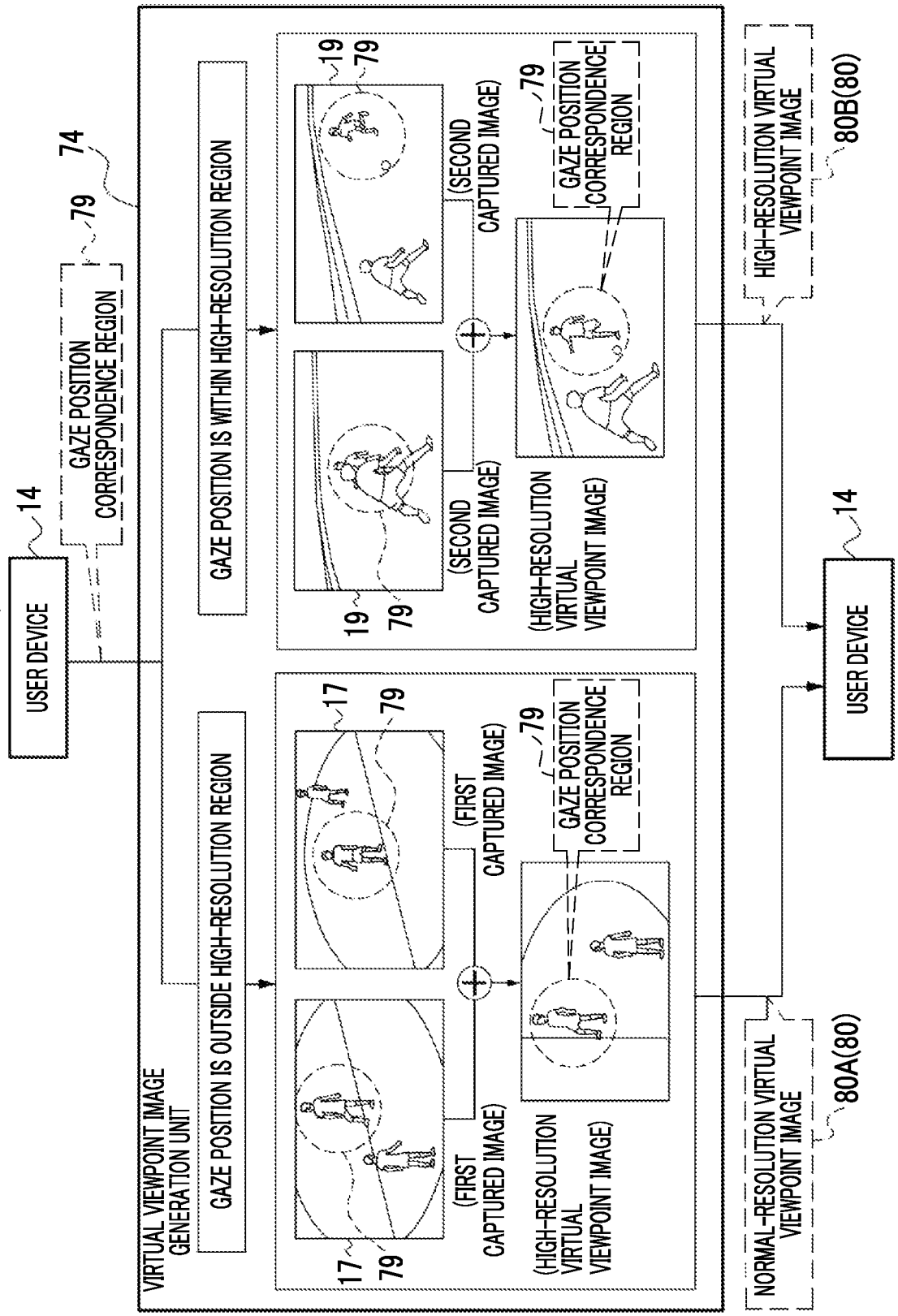
FIG. 9 is a block diagram showing an example of a function of a main part of a virtual viewpoint image generation unit.

As shown in FIG. 9 as an example, the virtual viewpoint image generation unit 74 generates the virtual viewpoint image 80 based on the gaze position by using the first captured image 17 received from the fixed imaging apparatus 16 or the second captured image 19 received by the movable imaging apparatus 18.

First, the virtual viewpoint image generation unit 74 acquires the gaze position correspondence region 79 indicating the gaze position from the user device 14. Specifically, for example, the viewer 26 displays the setting screen 36 (see FIG. 7) on the display 54 of the user device 14. The viewer 26 uses the touch panel 52A to designate the gaze position correspondence region 79 by touching a specific object image showing the specific object on the setting screen 36. The user device 14 transmits the designated gaze position correspondence region 79 to the information processing apparatus 12. It should be noted that, in a case in which the user device 14 is a spectacle-type device, such as a head-mounted display, the gaze position obtained from a visual line input device provided therein can also be used.

The virtual viewpoint image generation unit 74 determines whether or not the gaze position indicated by the gaze position correspondence region 79 acquired from the user device 14 is within the high-resolution region 75. The virtual viewpoint image generation unit 74 acquires the three-dimensional coordinates of the gaze position within the real space region of the soccer field 24 based on the position of the gaze position correspondence region 79 on the setting screen 36. The virtual viewpoint image generation unit 74 determines whether or not the gaze position is within the high-resolution region 75 by comparing the three-dimensional coordinates of the high-resolution region 75 with the three-dimensional coordinates of the gaze position.

In a case in which the gaze position is outside the high-resolution region 75, the virtual viewpoint image generation unit 74 generates the virtual viewpoint image 80 based on the gaze position correspondence region 79 by using the first captured image 17 including the gaze position correspondence region 79. The virtual viewpoint image 80 generated by using the first captured image 17 is a normal-resolution virtual viewpoint image 80A having a normal resolution.

In a case in which the gaze position is within the high-resolution region 75, the virtual viewpoint image generation unit 74 generates the virtual viewpoint image 80 based on the gaze position correspondence region 79 by using the second captured image 19 including the gaze position correspondence region 79. The virtual viewpoint image 80 generated by using the second captured image 19 is a high-resolution virtual viewpoint image 80B having the resolution higher than the predetermined value. The virtual viewpoint image generation unit 74 transmits the generated normal-resolution virtual viewpoint image 80A or high-resolution virtual viewpoint image 80B to the user device 14. It should be noted that the high-resolution virtual viewpoint image 80B is an example of a "virtual viewpoint image satisfying a predetermined condition", a "high-resolution virtual viewpoint image having a resolution equal to or higher than a predetermined value", and a "high-resolution virtual viewpoint image" according to the technology of the present disclosure.

Figure 10:
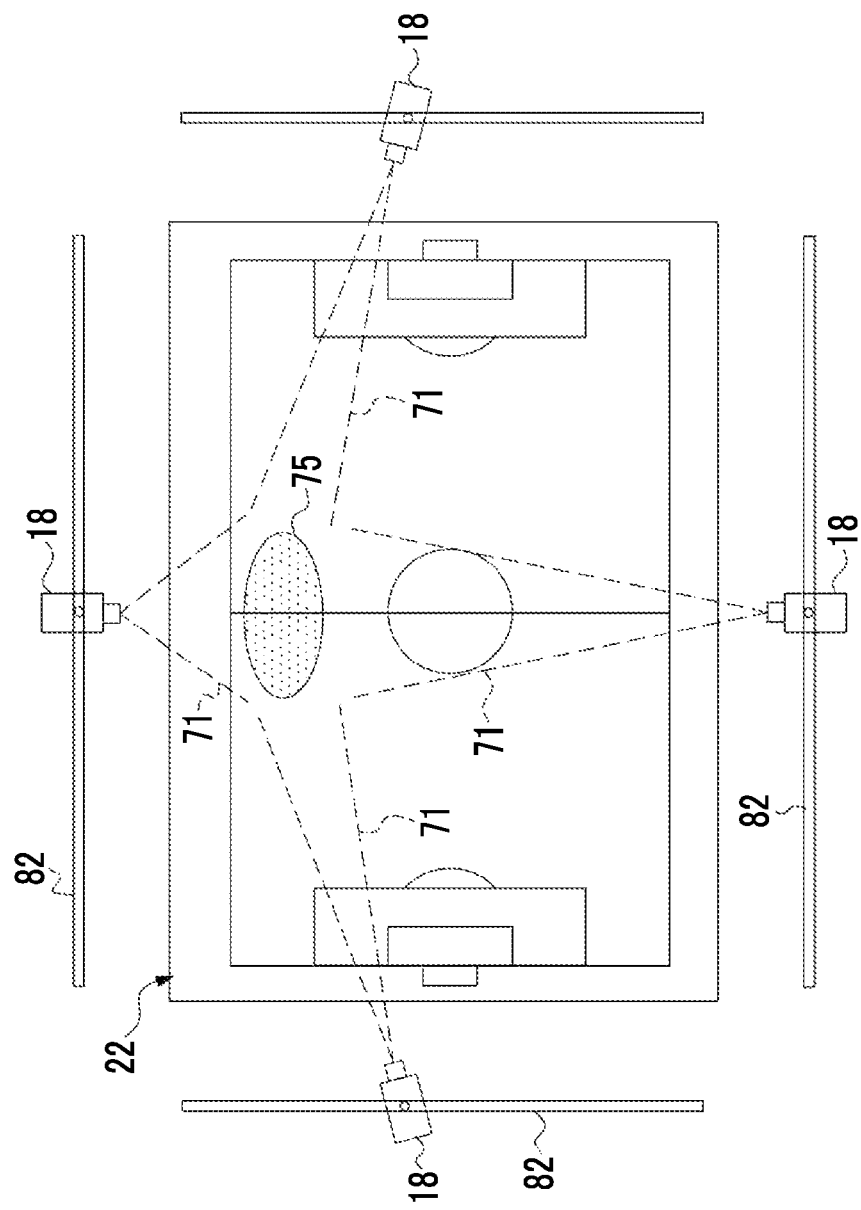
FIG. 10 is a conceptual diagram showing an example of the position and the angle of view of the movable imaging apparatus and the high-resolution region.

As shown in FIG. 10 as an example, the movable imaging apparatus control unit 72 can change the resolution of the high-resolution virtual viewpoint image 80B by changing the focal length of the movable imaging apparatus 18. In the example shown in FIG. 10, in a case in which the focal length of each movable imaging apparatus 18 is longer than that in the example shown in FIG. 5, the imaging range 71 of each movable imaging apparatus 18 is narrower than that in the example shown in FIG. 5.

In this case, the high-resolution region 75 derived from the second captured images 19 acquired by the four movable imaging apparatuses 18 is smaller than that in the example shown in FIG. 5. In addition, the resolution of the high-resolution virtual viewpoint image 80B created based on the gaze position within the high-resolution region 75 by using the second captured image 19 is higher than that in the example shown in FIG. 5.

Next, an action of the information processing apparatus 12 will be described.

First, an example of a flow of the movable imaging apparatus control processing executed by the movable imaging apparatus control unit 72 of the information processing apparatus 12 will be described with reference to FIG. 11.

Figure 11:
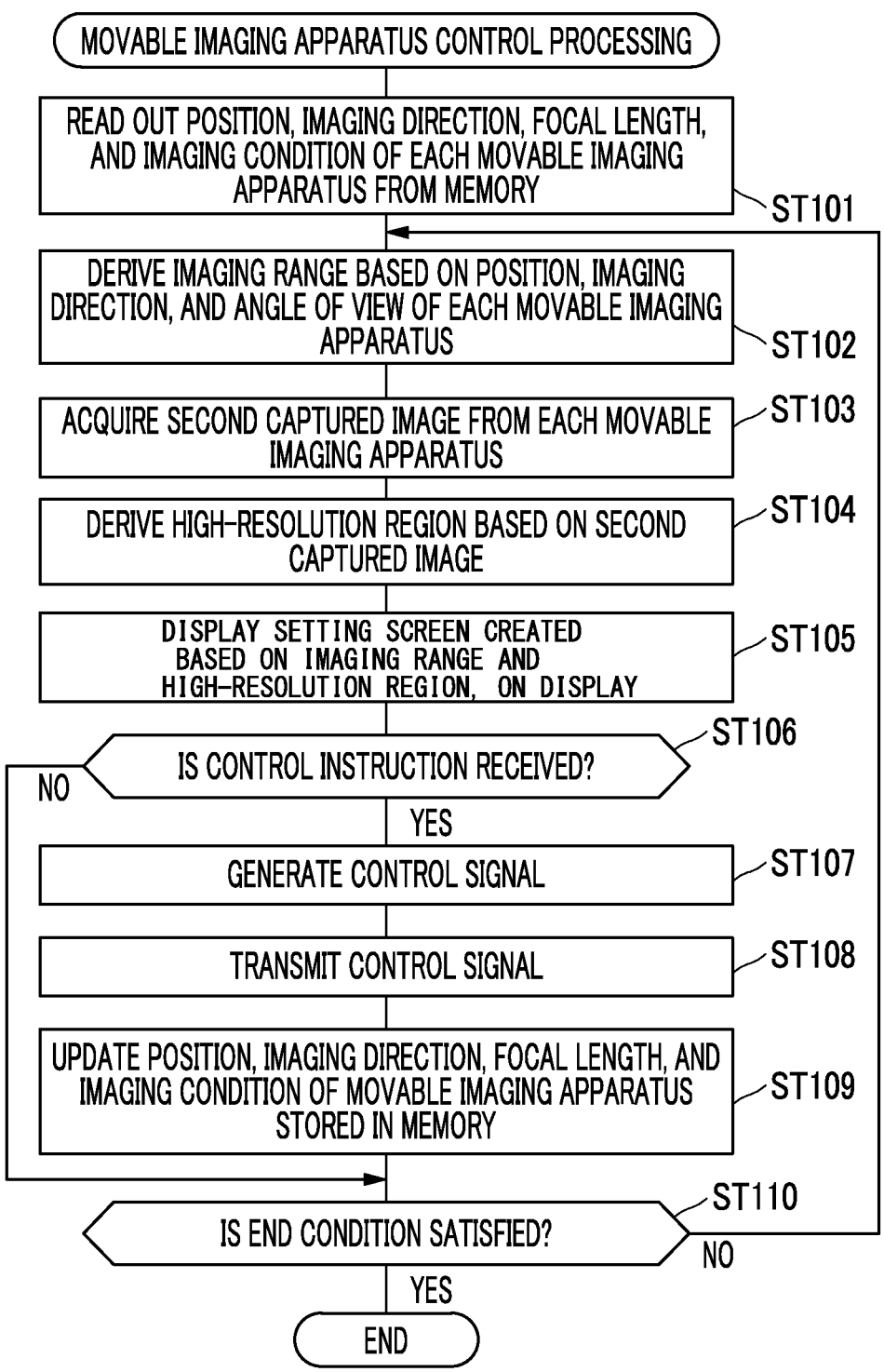
FIG. 11 is a flowchart showing an example of a flow of movable imaging apparatus control processing according to the first embodiment.

The movable imaging apparatus control processing shown in FIG. 11 is started, for example, in a case in which the manager of the information processing apparatus 12 inputs a display request for the setting screen 36 to the CPU 30A from the reception device 32. In the movable imaging apparatus control processing, in step ST101, the movable imaging apparatus control unit 72 reads out the position, the imaging direction, the focal length, and the imaging condition of each movable imaging apparatus 18 from the memory 30C. Thereafter, the movable imaging apparatus control processing proceeds to step ST102.

In step ST102, the movable imaging apparatus control unit 72 derives the imaging range 71 of each movable imaging apparatus 18 based on the position and the imaging direction of each movable imaging apparatus 18 read out from the memory 30C, and the angle of view of each movable imaging apparatus 18. It should be noted that the angle of view of each movable imaging apparatus 18 is calculated from the focal length of each movable imaging apparatus 18 and the information related to the imaging element 69. Thereafter, the movable imaging apparatus control processing proceeds to step ST103.

In step ST103, the movable imaging apparatus control unit 72 acquires the second captured image 19 obtained by performing imaging with the movable imaging apparatus 18. Thereafter, the movable imaging apparatus control processing proceeds to step ST104.

In step ST104, the movable imaging apparatus control unit 72 derives the high-resolution region 75 based on the second captured image 19 acquired from the movable imaging apparatus 18. Thereafter, the movable imaging apparatus control processing proceeds to step ST105.

In step ST105, the movable imaging apparatus control unit 72 displays the setting screen 36 created based on the derived imaging range 71 of each movable imaging apparatus 18 and the derived high-resolution region 75, on the display 34. Thereafter, the movable imaging apparatus control processing proceeds to step ST106.

In step ST106, the movable imaging apparatus control unit 72 determines whether or not the control instruction 76 is received from the reception device 32. In step ST106, in a case in which the control instruction 76 is received, a positive determination is made, and the movable imaging apparatus control processing proceeds to step ST107. In step ST106, in a case in which the control instruction 76 is not received, a negative determination is made, and the movable imaging apparatus control processing proceeds to step ST110.

In step ST107, the movable imaging apparatus control unit 72 generates the control signal 29 based on the received control instruction 76. Thereafter, the movable imaging apparatus control processing proceeds to step ST108.

In step ST108, the movable imaging apparatus control unit 72 transmits the generated control signal 29 to the corresponding movable imaging apparatus 18. The movable imaging apparatus 18 receives the control signal 29 and operates the change mechanism 95 in response to the received control signal 29. As a result, the imaging range 71 or the imaging condition of the movable imaging apparatus 18 is changed. Thereafter, the movable imaging apparatus control processing proceeds to step ST109.

In step ST109, the movable imaging apparatus control unit 72 updates the position, the imaging direction, the focal length, and the imaging condition of the movable imaging apparatus 18 stored in the memory 30C. Thereafter, the movable imaging apparatus control processing proceeds to step ST110.

In step ST110, the movable imaging apparatus control unit 72 determines whether or not an end condition is satisfied. Examples of the end condition include that imaging with the movable imaging apparatus 18 is stopped or that a stop button is operated. The stop button is displayed, for example, as a soft key on the display 34 of the information processing apparatus 12. Specifically, the stop button is displayed in the setting screen 36. In step ST110, in a case in which the end condition is satisfied, a positive determination is made, and the movable imaging apparatus control processing ends. In step ST110, in a case in which the end condition is not satisfied, a negative determination is made, and the movable imaging apparatus control processing proceeds to step ST102.

Next, an example of a flow of the virtual viewpoint image generation processing executed by the virtual viewpoint image generation unit 74 of the information processing apparatus 12 will be described with reference to FIG. 12.

Figure 12:
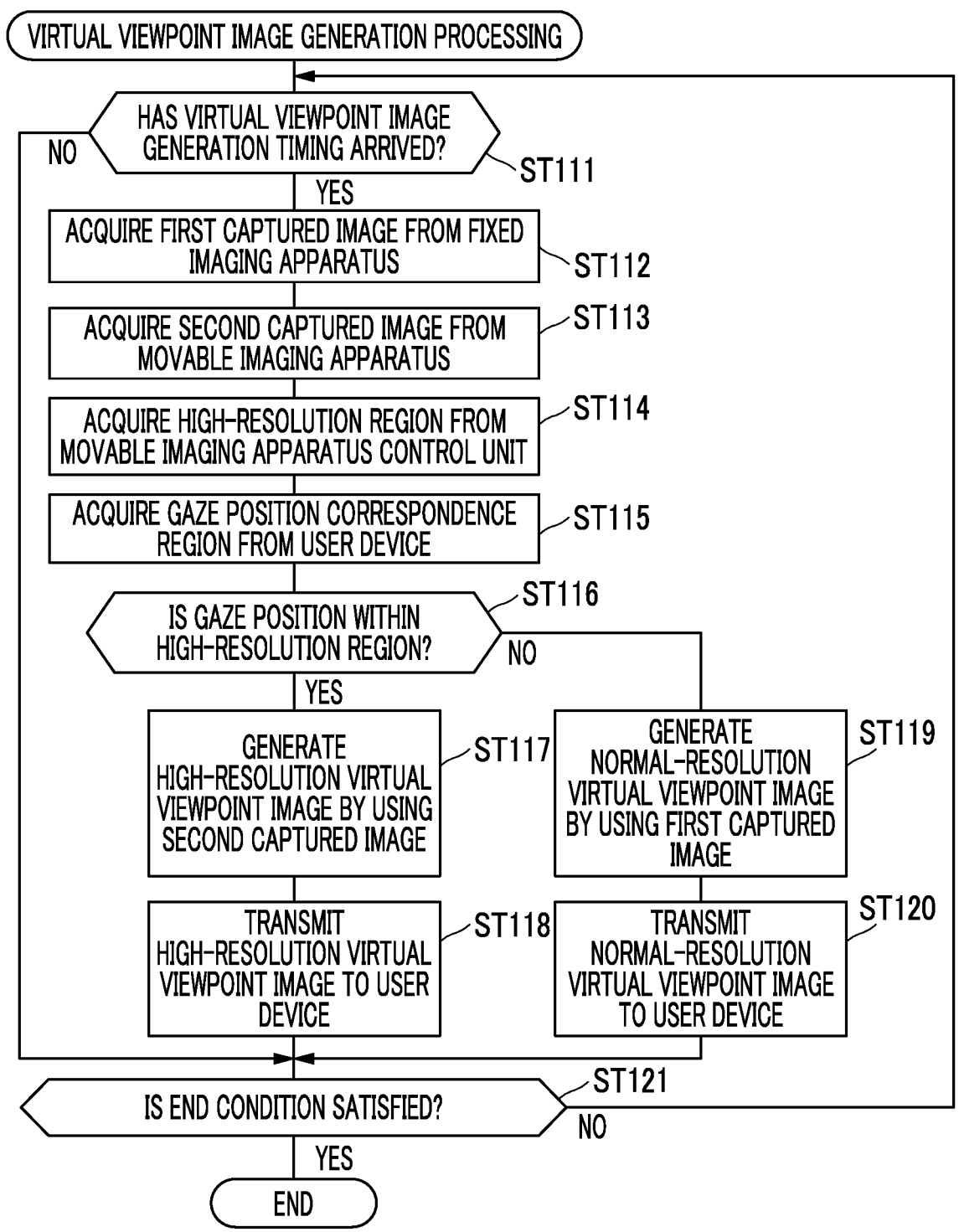
FIG. 12 is a flowchart showing an example of a flow of virtual viewpoint image generation processing.

The virtual viewpoint image generation processing shown in FIG. 12 is started in a case in which a viewing request for the virtual viewpoint image is input to the CPU 30A from the user device 14. In the virtual viewpoint image generation processing, in step ST111, the virtual viewpoint image generation unit 74 determines whether or not a virtual viewpoint image generation timing has arrived. In step ST111, in a case in which the virtual viewpoint image generation timing has arrived, a positive determination is made, and the virtual viewpoint image generation processing proceeds to step ST112. In step ST111, in a case in which the virtual viewpoint image generation timing has not arrived, a negative determination is made, and the virtual viewpoint image generation processing proceeds to step ST121.

In step ST112, the virtual viewpoint image generation unit 74 acquires the first captured image 17 from the fixed imaging apparatus 16. Thereafter, the virtual viewpoint image generation processing proceeds to step ST113.

In step ST113, the virtual viewpoint image generation unit 74 acquires the second captured image 19 from the movable imaging apparatus 18. Thereafter, the virtual viewpoint image generation processing proceeds to step ST114.

In step ST114, the virtual viewpoint image generation unit 74 acquires the high-resolution region 75 from the movable imaging apparatus control unit 72. Thereafter, the virtual viewpoint image generation processing proceeds to step ST115.

In step ST115, the virtual viewpoint image generation unit 74 acquires the gaze position correspondence region 79 from the user device 14. Thereafter, the virtual viewpoint image generation processing proceeds to step ST116.

In step ST116, the virtual viewpoint image generation unit 74 determines whether or not a gaze region indicated by the gaze position correspondence region 79 is within the high-resolution region 75. In step ST116, in a case in which the gaze region is within the high-resolution region 75, a positive determination is made, and the virtual viewpoint image generation processing proceeds to step ST117. In step ST116, in a case in which the gaze region is outside the high-resolution region 75, a negative determination is made, and the virtual viewpoint image generation processing proceeds to step ST119.

In step ST117, the virtual viewpoint image generation unit 74 generates the normal-resolution virtual viewpoint image 80A based on the gaze position correspondence region 79 by using the second captured image 19. Thereafter, the virtual viewpoint image generation processing proceeds to step ST118.

In step ST118, the virtual viewpoint image generation unit 74 transmits the generated normal-resolution virtual viewpoint image 80A to the user device 14. The user device 14 receives the normal-resolution virtual viewpoint image 80A, and displays the received normal-resolution virtual viewpoint image 80A on the display 54.

In step ST119, the virtual viewpoint image generation unit 74 generates the high-resolution virtual viewpoint image 80B based on the gaze position correspondence region 79 by using the first captured image 17. Thereafter, the virtual viewpoint image generation processing proceeds to step ST120.

In step ST120, the virtual viewpoint image generation unit 74 transmits the generated high-resolution virtual viewpoint image 80B to the user device 14. The user device 14 receives the high-resolution virtual viewpoint image 80B, and displays the received high-resolution virtual viewpoint image 80B on the display 54.

In step ST121, the virtual viewpoint image generation unit 74 determines whether or not the end condition is satisfied. Examples of the end condition include that imaging with the fixed imaging apparatus 16 or the movable imaging apparatus 18 is stopped or that the stop button is operated. The stop button is displayed, for example, as a soft key on the display 54 of the user device 14. Specifically, the stop button is displayed in a screen in which the normal-resolution virtual viewpoint image 80A or the high-resolution virtual viewpoint image 80B is displayed. In step ST121, in a case in which the end condition is satisfied, a positive determination is made, and the virtual viewpoint image generation processing ends. In step ST121, in a case in which the end condition is not satisfied, a negative determination is made, and the virtual viewpoint image generation processing proceeds to step ST111.

As described above, in the first embodiment, the information processing apparatus 12 comprises the CPU 30A that can generate the virtual viewpoint image 80 based on the first captured image 17 and the second captured image 19 acquired by imaging with the plurality of imaging apparatuses, and the memory 30C connected to the CPU 30A. The movable imaging apparatus control unit 72 of the CPU 30A generates the control signal 29 for the movable imaging apparatus 18 based on the control instruction 76 given from the outside regarding the generation of the virtual viewpoint image 80. Therefore, with the present configuration, as compared with a case in which the control signal 29 for the movable imaging apparatus 18 is not generated, it is possible to generate the virtual viewpoint image 80 for the region selected in response to the control instruction 76 given from the outside.

In addition, in the first embodiment, the control signal 29 is the signal related to the control of causing the movable imaging apparatus 18 to acquire the second captured image 19 used to generate the virtual viewpoint image 80 satisfying the predetermined condition in response to the control instruction 76. Therefore, with the present configuration, as compared with a case in which the control signal 29 for the movable imaging apparatus 18 is not generated, it is possible to generate the virtual viewpoint image 80 satisfying the predetermined condition in response to the control instruction 76 for the region selected in response to the control instruction 76 given from the outside.

In addition, in the first embodiment, the control signal 29 is the signal related to the control of causing the movable imaging apparatus 18 to acquire the second captured image 19 used to generate the high-resolution virtual viewpoint image 80B having the resolution equal to or higher than the predetermined value. Therefore, with the present configuration, as compared with a case in which the control signal 29 for the movable imaging apparatus 18 is not generated, it is possible to generate the high-resolution virtual viewpoint image 80B for the region selected in response to the control instruction 76 given from the outside.

In addition, in the first embodiment, the control signal 29 is the signal related to the control for changing the imaging range 71 of the movable imaging apparatus 18. Therefore, with the present configuration, it is possible to generate the virtual viewpoint image 80 for the region selected in response to the control instruction 76 given from the outside by simple control of changing the imaging range 71 of the movable imaging apparatus 18.

In addition, in the first embodiment, the control signal 29 includes the position change signal 29A for changing the position of the movable imaging apparatus 18. Therefore, with the present configuration, it is possible to generate the virtual viewpoint image 80 for the region selected in response to the control instruction 76 given from the outside by simple control of changing the position of the movable imaging apparatus 18.

In addition, in the first embodiment, the control signal 29 includes the imaging direction change signal 29B for changing the imaging direction of the movable imaging apparatus 18. Therefore, with the present configuration, it is possible to generate the virtual viewpoint image 80 for the region selected in response to the control instruction 76 given from the outside by simple control of changing the imaging direction of the movable imaging apparatus 18.

In addition, in the first embodiment, the movable imaging apparatus 18 has the optical zoom function, and the control signal 29 includes the focal length change signal 29C for changing the focal length of the movable imaging apparatus 18. Therefore, with the present configuration, it is possible to generate the virtual viewpoint image 80 for the region selected in response to the control instruction 76 given from the outside by simple control of changing the focal length of the movable imaging apparatus 18.

In addition, in the first embodiment, the movable imaging apparatus 18 includes the change mechanism 95 for changing the position, the imaging direction, the focal length, and the imaging condition of the movable imaging apparatus 18. The change mechanism 95 changes at least one of the position, the imaging direction, the focal length, or the imaging condition of the movable imaging apparatus 18 in response to the control signal 29. Therefore, with the present configuration, as compared with a case in which the position, the imaging direction, the focal length, and the imaging condition of the movable imaging apparatus 18 are manually changed without using the change mechanism 95, it is possible to easily change the position, the imaging direction, the focal length, and the imaging condition of the movable imaging apparatus 18.

In addition, in the first embodiment, the movable imaging apparatus control unit 72 can change the resolution of the high-resolution virtual viewpoint image 80B by changing the focal length of the movable imaging apparatus 18. Therefore, with the present configuration, as compared with a case in which the resolution of the high-resolution virtual viewpoint image 80B cannot be changed, the resolution of the high-resolution virtual viewpoint image 80B can be further improved by simple control of changing the focal length of the movable imaging apparatus 18.

Second Embodiment

In the first embodiment, the aspect example is described in which the movable imaging apparatus control unit 72 generates the control signal 29 for the movable imaging apparatus 18 based on the control instruction 76 received from the reception device 32. In the second embodiment, the movable imaging apparatus control unit 72 generates the control signal 29 for the movable imaging apparatus 18 based on a subject that is present in the real space region in the soccer stadium 22 that can be imaged by the imaging apparatus. In the following, a more detailed description will be made. It should be noted that, in the second embodiment, the same components as the components described in the first embodiment will be represented by the same reference numerals, and the description thereof will be omitted.

Figure 13:
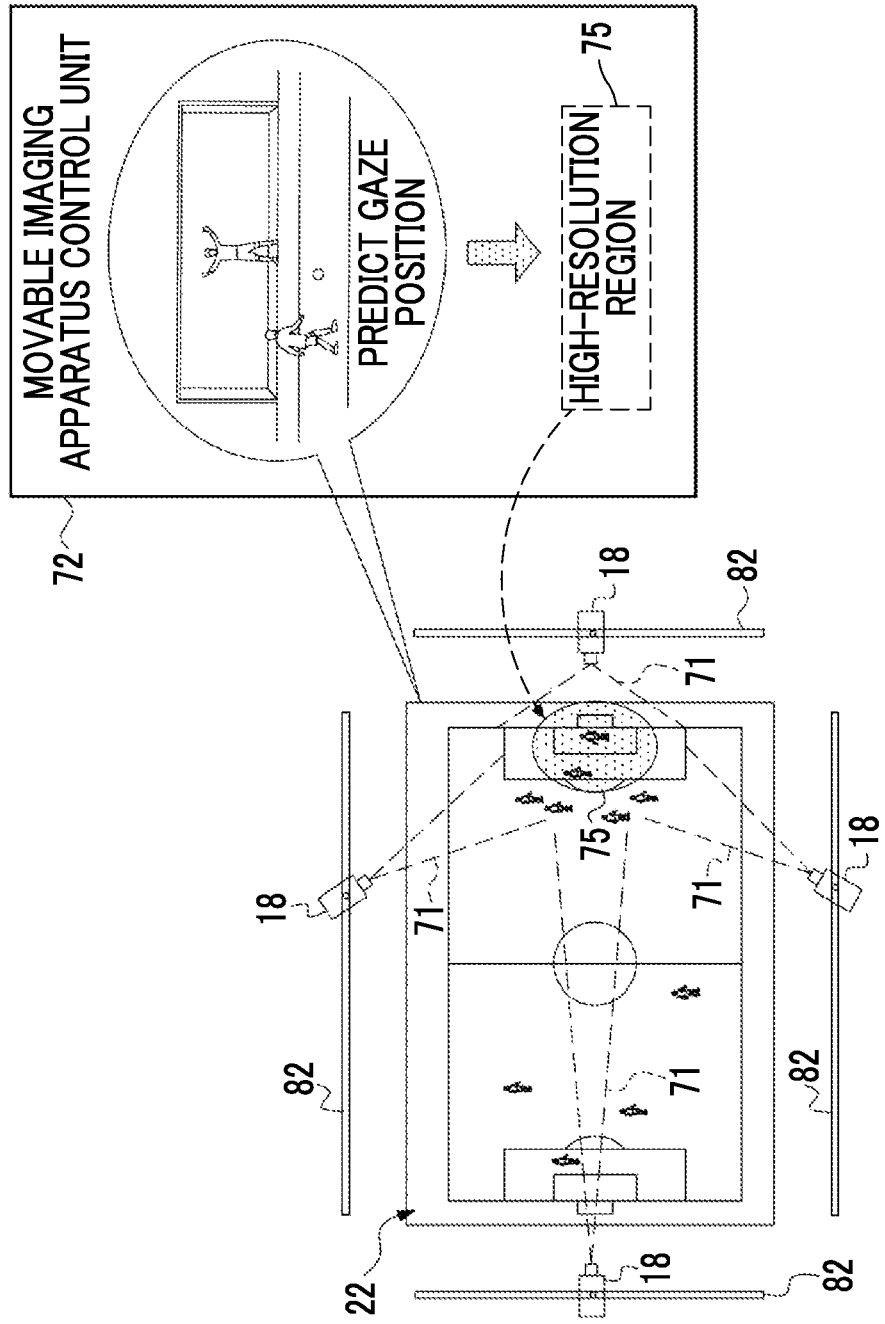
FIG. 13 is an explanatory diagram showing an example of a function of a main part of a movable imaging apparatus control unit according to a second embodiment.

As shown in FIG. 13 as an example, the movable imaging apparatus control unit 72 predicts a region predicted to have a high degree of interest from the viewer 26 who uses the user device 14 among the real space regions in the soccer stadium 22, that is, the gaze position, based on a state of the subject. In the example shown in FIG. 13, the subject is in a process of performing a penalty kick. The movable imaging apparatus control unit 72 predicts that a penalty area is the gaze position based on the state of the subject. The movable imaging apparatus control unit 72 generates the control signal 29 for causing the movable imaging apparatus 18 to acquire the second captured image 19 used to generate the high-resolution virtual viewpoint image 80B of the predicted gaze position. That is, in other words, the movable imaging apparatus control unit 72 generates the control signal 29 for changing the imaging range 71 of the movable imaging apparatus 18 such that the predicted gaze position is within the high-resolution region 75.

Figure 14:
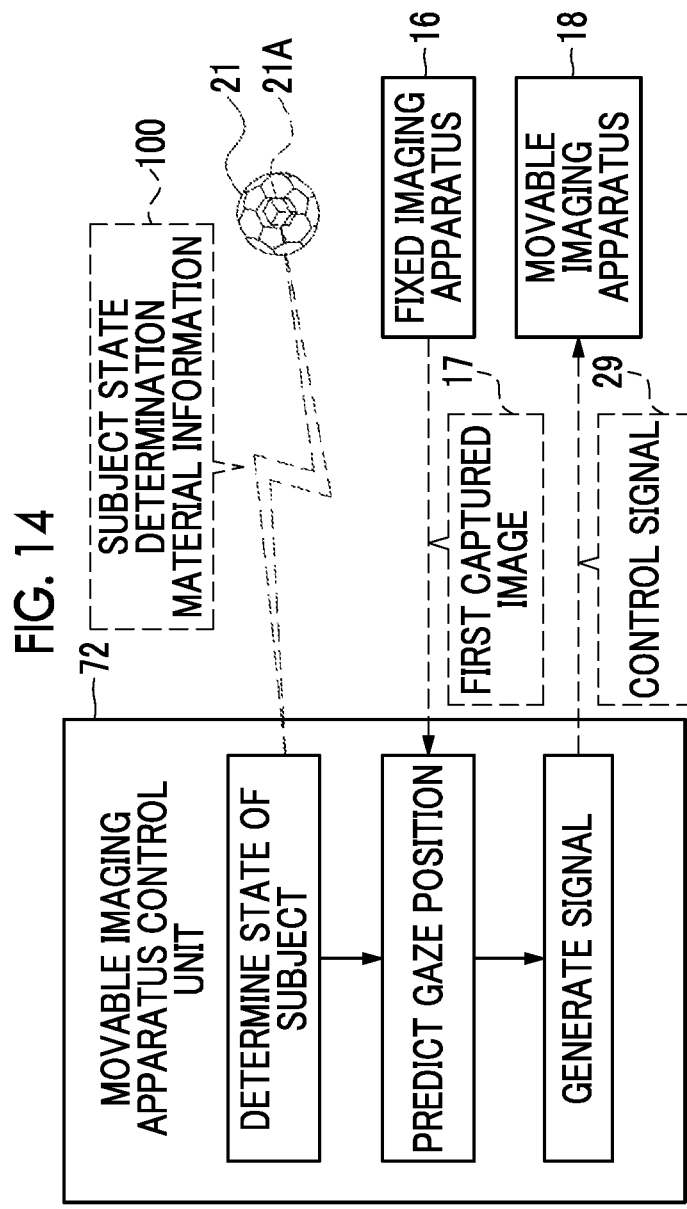
FIG. 14 is a block diagram showing an example of the function of the main part of the movable imaging apparatus control unit according to the second embodiment.

Specifically, as shown in FIG. 14 as an example, for example, a soccer ball 21 has a built-in position sensor 21A that detects a position of the soccer ball 21 in the soccer stadium 22. As the position sensor 21A, for example, a gyro sensor that detects an angular velocity due to its own movement or a position sensor using a GNSS satellite (for example, a GPS satellite) is used.

The movable imaging apparatus control unit 72 receives an output signal from the position sensor 21A as subject state determination material information 100 at a regular (for example, several tenths of a second) clock cycle. The movable imaging apparatus control unit 72 determines the state of the subject based on the received subject state determination material information 100. In the example shown in FIG. 13, the movable imaging apparatus control unit 72 determines that the soccer ball 21 is in a stationary state for a time exceeding a predetermined time (for example, 5 seconds) based on the subject state determination material information 100.

The movable imaging apparatus control unit 72 acquires a plurality of first captured images 17 obtained by the plurality of fixed imaging apparatuses 16. The movable imaging apparatus control unit 72 acquires three-dimensional coordinates indicating the positions of the soccer ball 21 and the player in the real space region in the soccer stadium 22 from the first captured image 17 by using the image recognition technology. The movable imaging apparatus control unit 72 predicts the gaze position based on the state of the subject, and the positions of the soccer ball 21 and the player. The gaze position is a position indicated by the three-dimensional coordinates in the real space region in the soccer stadium 22.

The movable imaging apparatus control unit 72 generates the control signal 29 for changing the imaging range 71 of the movable imaging apparatus 18 such that the predicted gaze position is within the high-resolution region 75. The movable imaging apparatus control unit 72 transmits the generated control signal 29 to the movable imaging apparatus 18. Specifically, the position change signal 29A included in the control signal 29 causes the imaging apparatus slide mechanism 95A (see FIG. 8) to move the movable imaging apparatus 18 to a position closest to the predicted gaze position. The imaging direction change signal 29B included in the control signal 29 causes the revolution mechanism 95B (see FIG. 8) to direct the movable imaging apparatus 18 to the gaze position. The focal length change signal 29C included in the control signal 29 causes the lens slide mechanism 95C (see FIG. 8) to change the focal length of the movable imaging apparatus 18 such that the gaze position is in focus. The imaging condition change signal 29D included in the control signal 29 causes the imaging condition change mechanism 95D (see FIG. 8) to change the shutter speed, the stop, and the sensitivity of the movable imaging apparatus 18 in accordance with the brightness of the subject and the like.

Next, an example of a flow of the movable imaging apparatus control processing executed by the movable imaging apparatus control unit 72 according to the second embodiment will be described with reference to FIG. 15.

Figure 15:
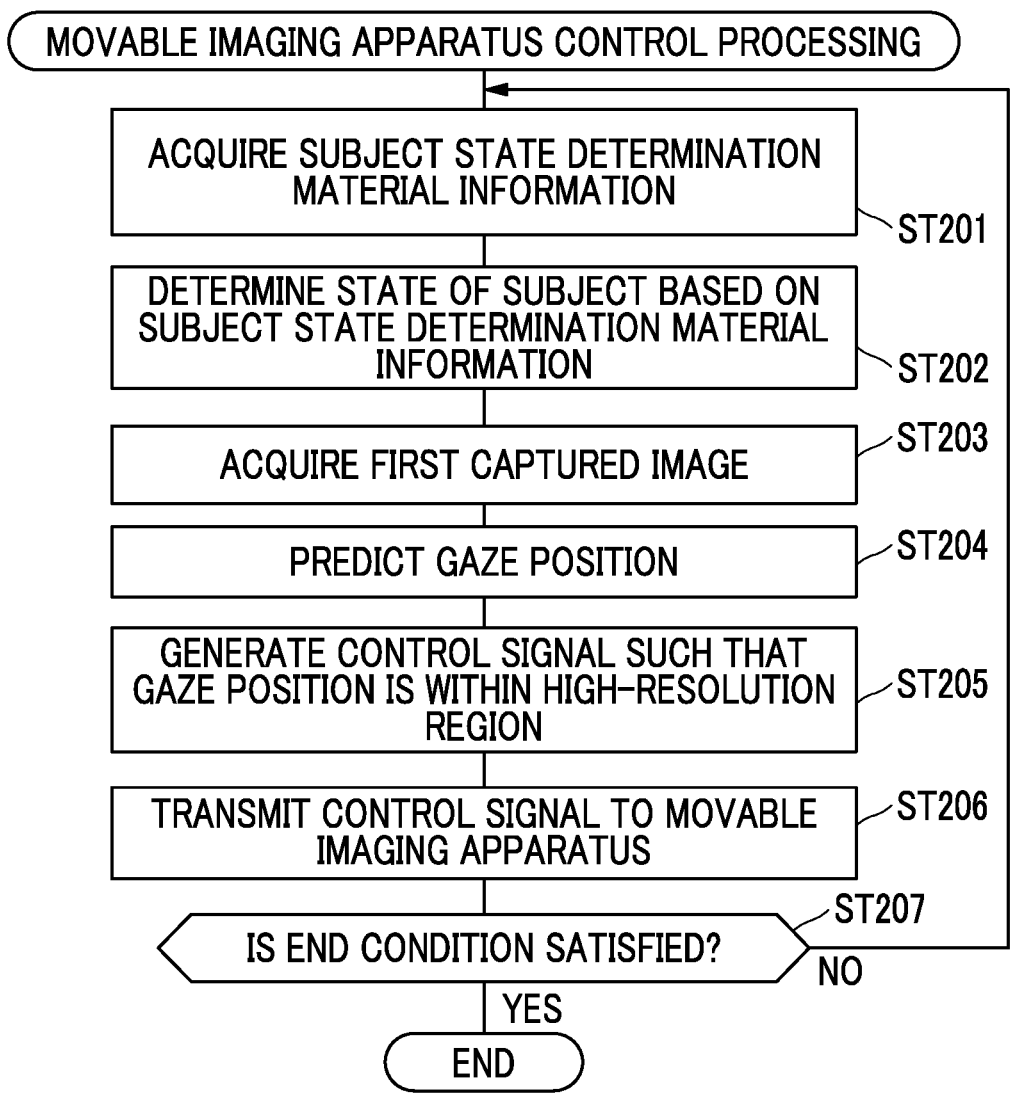
FIG. 15 is a flowchart showing an example of a flow of movable imaging apparatus control processing according to the second embodiment.

The movable imaging apparatus control processing shown in FIG. 15 is started, for example, in a case in which the manager of the information processing apparatus 12 operates a start button for starting the prediction of the gaze position. The start button is displayed, for example, as a soft key on the display 34 of the information processing apparatus 12.

In the movable imaging apparatus control processing according to the second embodiment, in step ST201, the movable imaging apparatus control unit 72 acquires the subject state determination material information 100. Thereafter, the movable imaging apparatus control processing proceeds to step ST202.

In step ST202, the movable imaging apparatus control unit 72 determines the state of the subject based on the subject state determination material information 100. Thereafter, the movable imaging apparatus control processing proceeds to step ST203.

In step ST203, the movable imaging apparatus control unit 72 acquires the first captured image 17 from the fixed imaging apparatus 16. Thereafter, the movable imaging apparatus control processing proceeds to step ST204.

In step ST204, the movable imaging apparatus control unit 72 predicts the gaze position based on the determined state of the subject and the information obtained from the first captured image 17. Thereafter, the movable imaging apparatus control processing proceeds to step ST205.

In step ST205, the movable imaging apparatus control unit 72 generates the control signal 29 such that the predicted gaze position is within the high-resolution region 75. Thereafter, the movable imaging apparatus control processing proceeds to step ST206.

In step ST206, the movable imaging apparatus control unit 72 transmits the generated control signal 29 to the movable imaging apparatus 18. Thereafter, the movable imaging apparatus control processing proceeds to step ST207.

In step ST207, the movable imaging apparatus control unit 72 determines whether or not the end condition is satisfied. Examples of the end condition include that imaging with the movable imaging apparatus 18 is stopped or that the stop button for stopping the prediction of the gaze position is operated. The stop button is displayed, for example, as a soft key on the display 34 of the information processing apparatus 12. In step ST207, in a case in which the end condition is satisfied, a positive determination is made, and the movable imaging apparatus control processing ends. In step ST207, in a case in which the end condition is not satisfied, a negative determination is made, and the movable imaging apparatus control processing proceeds to step ST201.

As described above, in the second embodiment, the information processing apparatus 12 generates the control signal 29 for causing the movable imaging apparatus 18 to acquire the second captured image 19 used to generate the high-resolution virtual viewpoint image 80B of the gaze position predicted based on the state of the subject in the real space region that can be imaged by the plurality of imaging apparatuses. Therefore, with the present configuration, it is possible to obtain the high-resolution virtual viewpoint image 80B of the gaze position predicted based on the state of the subject.

In the second embodiment, the position information of the soccer ball 21 obtained from the position sensor 21A built in the soccer ball 21 is used as the subject state determination material information 100, but the technology of the present disclosure is not limited to this. For example, a position sensor may be attached to the player and the position information of the player may be used as the subject state determination material information 100. In addition, the plurality of first captured images 17 acquired by the plurality of fixed imaging apparatuses 16 may be acquired as the subject state determination material information 100 to determine the state of the subject by using the image recognition technology using machine learning or the like.

In addition, in the second embodiment, the movable imaging apparatus control unit 72 determines that the soccer ball 21 is in a stationary state for a time exceeding the predetermined time based on the subject state determination material information 100, but the technology of the present disclosure is not limited to this. The movable imaging apparatus control unit 72 may determine the state, such as the soccer ball 21 having crossed the line of the soccer field 24, the player being positioned at a specific disposition, or the players being crowded in a narrow range, based on the subject state determination material information 100. The movable imaging apparatus control unit 72 may predict the gaze position based on these states of the subject.

Third Embodiment

In the first embodiment, the instruction related to the imaging range 71 of the movable imaging apparatus 18 is described as an example of the control instruction 76, but in the third embodiment, a form example will be described in which an instruction related to the high-resolution region 75 which is a target for generating the high-resolution virtual viewpoint image 80B is used as the control instruction 76. It should be noted that, in the third embodiment, the same components as the components described in the first and second embodiments will be represented by the same reference numerals, and the description thereof will be omitted.

In the third embodiment, the high-resolution region 75 is, for example, a region including the specific object included in the real space region in the soccer stadium 22. The specific object is, for example, a specific player.

Figure 16:
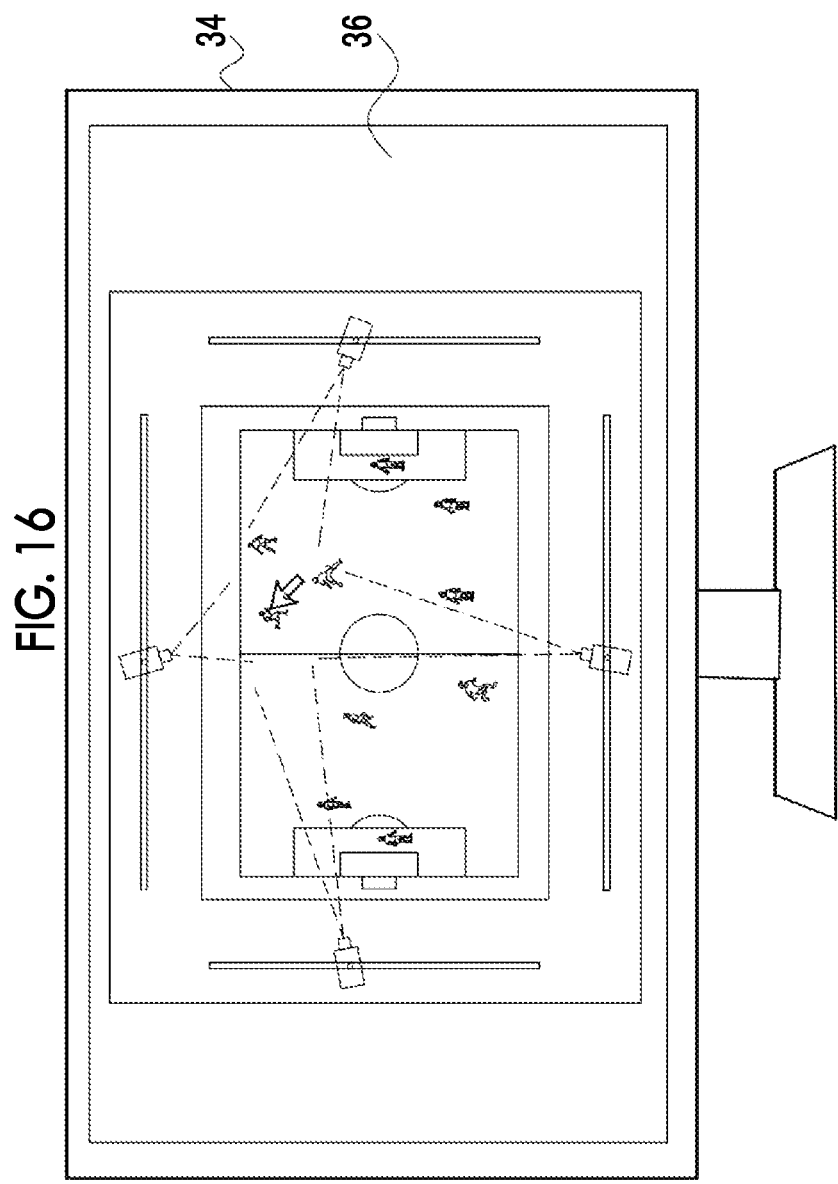
FIG. 16 is a conceptual diagram showing an example of a setting screen according to a third embodiment.

An example of a method in which the manager gives the control instruction 76 related to the high-resolution region 75 including the specific object to the information processing apparatus 12 will be described. As shown in FIG. 16 as an example, the manager clicks the specific object image showing the specific object on the setting screen 36 displayed on the display 34 by using the mouse.

Figure 17:
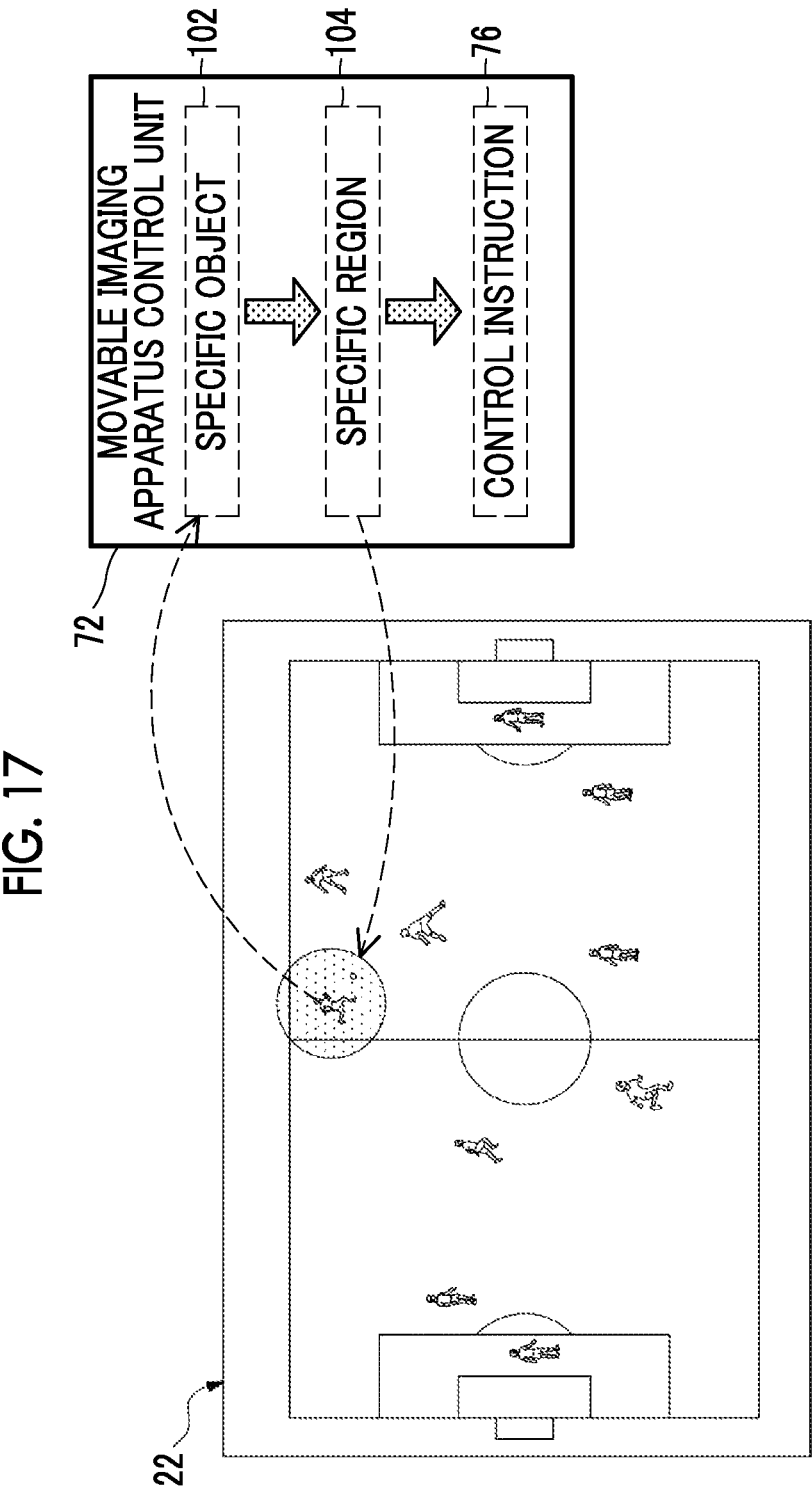
FIG. 17 is a conceptual diagram showing an example of a specific region including a specific object.

As shown in FIG. 17 as an example, the movable imaging apparatus control unit 72 acquires the three-dimensional coordinates of a specific object 102 in the real space region in the soccer stadium 22 based on the position of the specific object image on the setting screen 36. In addition, the movable imaging apparatus control unit 72 decides a region having a radius of several meters (for example, a radius of 2 meters) about the coordinates of the specific object 102 as a specific region 104. The movable imaging apparatus control unit 72 receives the control instruction 76 including the coordinates of the specific region 104. It should be noted that the specific object is an example of a "specific object" according to the technology of the present disclosure. In addition, the specific region 104 is an example of a "specific region" according to the technology of the present disclosure.

In a case in which the information indicating the specific region 104 in the real space region is included in the control instruction 76, the movable imaging apparatus control unit 72 generates the control signal 29 for causing the movable imaging apparatus 18 to acquire the second captured image 19 used to generate the high-resolution virtual viewpoint image 80B of the specific region 104. In other words, the movable imaging apparatus control unit 72 generates the control signal 29 for changing the imaging range 71 of the movable imaging apparatus 18 such that the specific region 104 is within the high-resolution region 75. A method of generating the control signal 29 such that the specific region 104 in the real space is within the high-resolution region 75 is the same as that described in the second embodiment, and thus the description thereof will be omitted here.

As described above, in the third embodiment, the control instruction 76 includes the instruction related to the high-resolution region 75 which is the target for generating the high-resolution virtual viewpoint image 80B. Therefore, with the present configuration, it is possible to decide a region intended by the manager among the real space regions in the soccer stadium 22 as the high-resolution region 75.

In addition, in the third embodiment, in a case in which the information indicating the specific region 104 in the real space region that can be imaged by the plurality of imaging apparatuses is included in the control instruction 76, the movable imaging apparatus control unit 72 generates the control signal 29 for causing the movable imaging apparatus 18 to acquire the second captured image 19 used to generate the high-resolution virtual viewpoint image 80B of the specific region 104. Therefore, with the present configuration, it is possible to decide the specific region 104 as the high-resolution region 75.

In addition, in the third embodiment, the high-resolution region 75 is the region including the specific object 102 included in the real space region that can be imaged by the plurality of imaging apparatuses. Therefore, with the present configuration, it is possible to decide an object intended by the manager among the objects in the real space region as the high-resolution region 75.

It should be noted that, in the third embodiment, the specific object 102 is the specific player, but the technology of the present disclosure is not limited to this. The specific object 102 may be any object that can be included in the imaging region, including the soccer ball 21, the goal, a referee, a line, or the like.

In addition, in the third embodiment, the high-resolution region 75 is the region including the specific object 102, but the technology of the present disclosure is not limited to this. The high-resolution region 75 does not have to be the region including the specific object 102. The movable imaging apparatus control unit 72 may receive the control instruction 76 including the region optionally designated by the manager on the setting screen 36 as the specific region 104 to generate the control signal 29 such that the specific region 104 is the high-resolution region 75.

Figure 18:
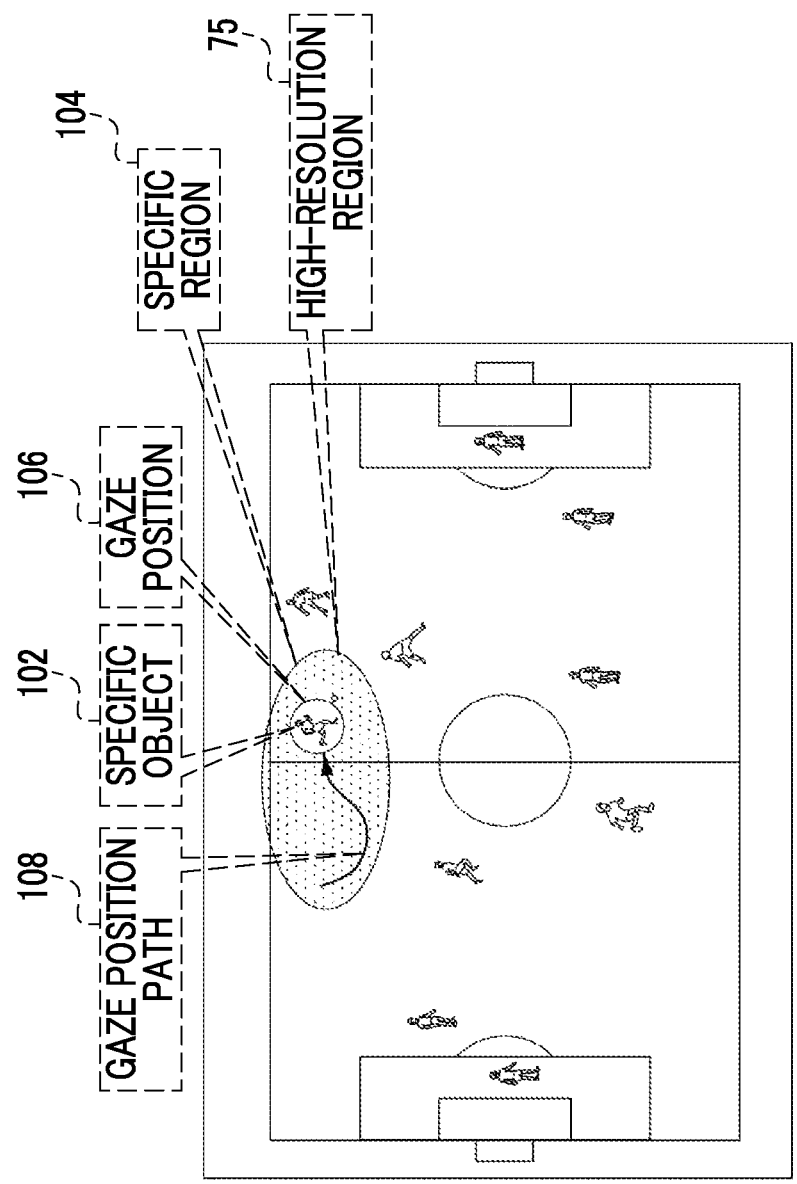
FIG. 18 is a conceptual diagram showing an example of the high-resolution region including a gaze position path.

In addition, the high-resolution region 75 may be a region including a path of the gaze position with respect to the virtual viewpoint image 80. As shown in FIG. 18 as an example, for example, in a case in which the position at which the specific object 102 is present is set as a gaze position 106, a region including a gaze position path 108, which is a path of the gaze position 106, is decided as the specific region 104. The movable imaging apparatus control unit 72 receives the control instruction 76 including the specific region 104, and generates the control signal 29 such that the specific region 104 is within the high-resolution region 75. Therefore, with the present configuration, it is possible to decide the region having a high gaze degree from the viewer 26 among the real space regions as the high-resolution region 75. It should be noted that the gaze position path 108 is an example of a "path of the gaze position" according to the technology of the present disclosure.

Fourth Embodiment

In the first to third embodiments, the aspect is described in which the manager inputs the control instruction 76 from the reception device 32 and the movable imaging apparatus control unit 72 decides the high-resolution region 75 based on the control instruction 76. In the fourth embodiment, the user device 14 transmits the control instruction 76 by the operation of a plurality of viewers 26 in addition to the manager. In the following, in a case in which it is not necessary to distinguish between the manager and the viewer 26, the manager and the viewer 26 are collectively referred to as a "user". The movable imaging apparatus control unit 72 aggregates a plurality of control instructions 76 from a plurality of users. The movable imaging apparatus control unit 72 decides the high-resolution region 75 based on an aggregation result, and generates the control signal 29 for the movable imaging apparatus 18 based on the decided high-resolution region 75. It should be noted that, in the fourth embodiment, the same components as the components described in the first to third embodiments will be represented by the same reference numerals, and the description thereof will be omitted.

Figure 19:
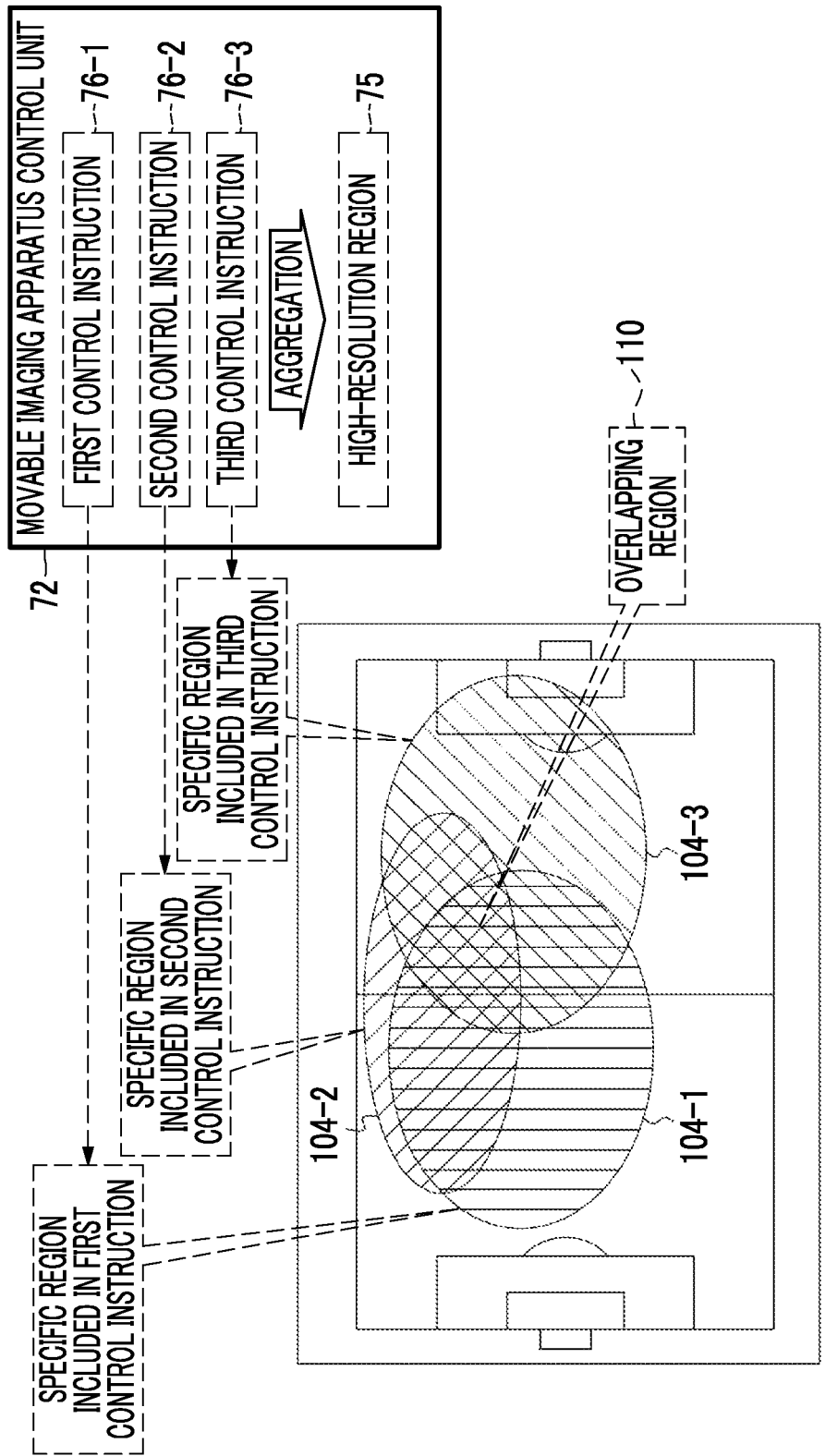
FIG. 19 is a conceptual diagram showing an example of a specific region and an overlapping region according to a fourth embodiment.

As shown in FIG. 19 as an example, a first control instruction 76-1 given by a first user includes a specific region 104-1. A second control instruction 76-2 given by a second user includes a specific region 104-2. A third control instruction 76-3 given by a third user includes a specific region 104-3. The specific regions 104-1 to 104-3 overlap each other. It should be noted that, in the present embodiment, a plurality of specific regions 104-1 to 104-3 included in the plurality of control instructions 76-1 to 76-3 overlap each other, but the technology of the present disclosure is not limited to this, and the specific regions 104-1 to 104-3 do not have to overlap each other. In the following, in a case in which it is not necessary to distinguish between the control instructions 76-1 to 76-3, the control instructions 76-1 to 76-3 are collectively referred to as the "plurality of control instructions 76". In a case in which it is not necessary to distinguish between the specific regions 104-1 to 104-3, the specific regions 104-1 to 104-3 are collectively referred to as the "plurality of specific regions 104".

The movable imaging apparatus control unit 72 decides the high-resolution region 75 based on the aggregation result of the plurality of specific regions 104. For example, the movable imaging apparatus control unit 72 decides an overlapping region 110 of the plurality of specific regions 104 as the high-resolution region 75. Alternatively, the movable imaging apparatus control unit 72 may decide the high-resolution region 75 including all of the plurality of specific regions 104. Alternatively, the movable imaging apparatus control unit 72 may statistically process the plurality of specific regions 104 to decide a region determined to have the degree of interest exceeding the predetermined value among the real space regions in the soccer stadium 22 as the high-resolution region 75.

Figure 20:
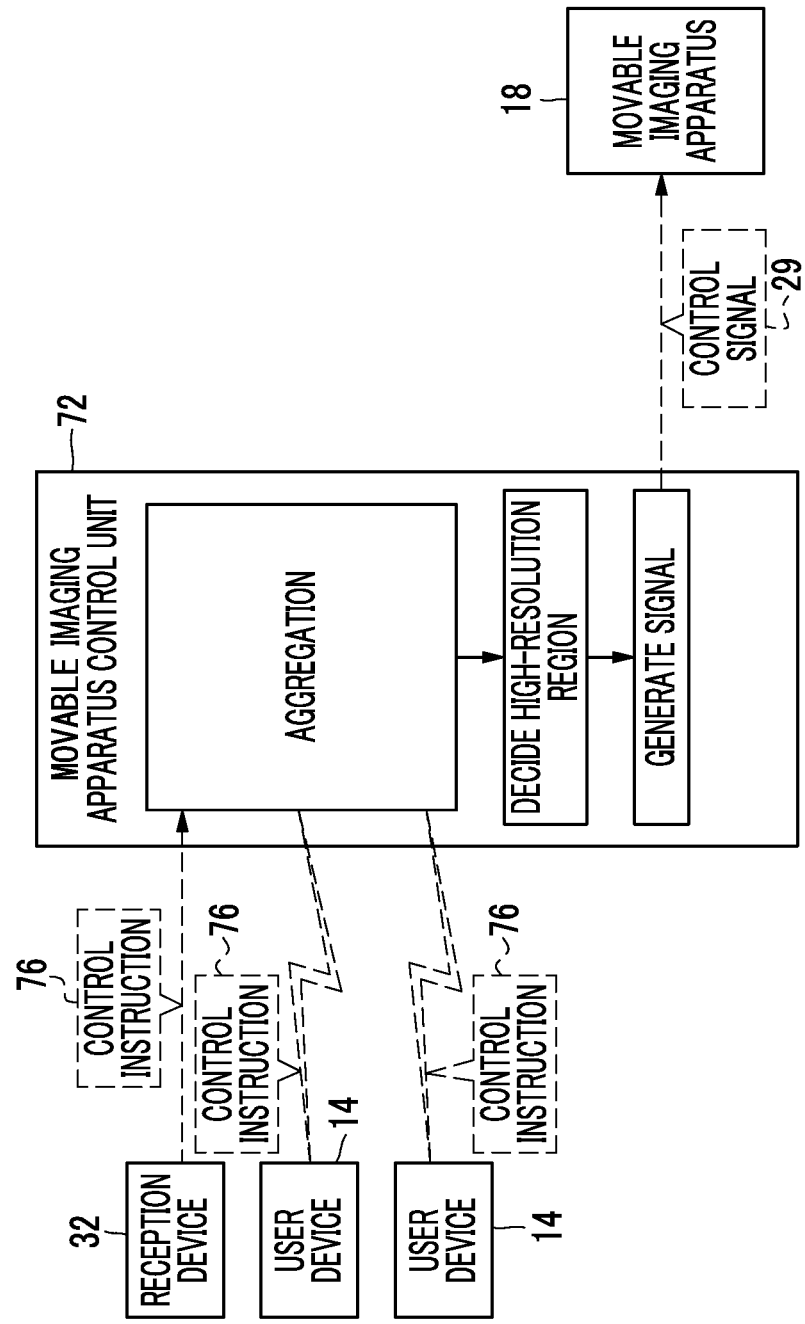
FIG. 20 is a block diagram showing an example of a function of a main part of a movable imaging apparatus control unit according to the fourth embodiment.

As shown in FIG. 20 as an example, the movable imaging apparatus control unit 72 aggregates the plurality of control instructions 76 received from the reception device 32 and the user device 14. The movable imaging apparatus control unit 72 decides the high-resolution region 75 based on the aggregation result of the plurality of control instructions 76. The movable imaging apparatus control unit 72 generates the control signal 29 for the movable imaging apparatus 18 based on the decided high-resolution region 75.

As described above, in the fourth embodiment, the movable imaging apparatus control unit 72 decides the high-resolution region 75 based on the aggregation result of the plurality of control instructions 76 and generates the control signal 29 for the movable imaging apparatus 18 based on the decided high-resolution region 75. Therefore, with the present configuration, as compared with a case in which the high-resolution region 75 is decided based on one control instruction 76, it is possible to decide the high-resolution region 75 to which the plurality of control instructions 76 are reflected.

Fifth Embodiment

In the third embodiment, the aspect example is described in which the movable imaging apparatus control unit 72 generates the control signal 29 for the movable imaging apparatus 18 based on the control instruction 76 related to the high-resolution region 75. In the fifth embodiment, the movable imaging apparatus control unit 72 decides the high-resolution region 75 based on a history of the control instruction 76 related to the high-resolution region 75, and generates the control signal 29 for the movable imaging apparatus 18 based on the decided high-resolution region 75. It should be noted that, in the fifth embodiment, the same components as the components described in the first to fourth embodiments will be represented by the same reference numerals, and the description thereof will be omitted.

Figure 21:
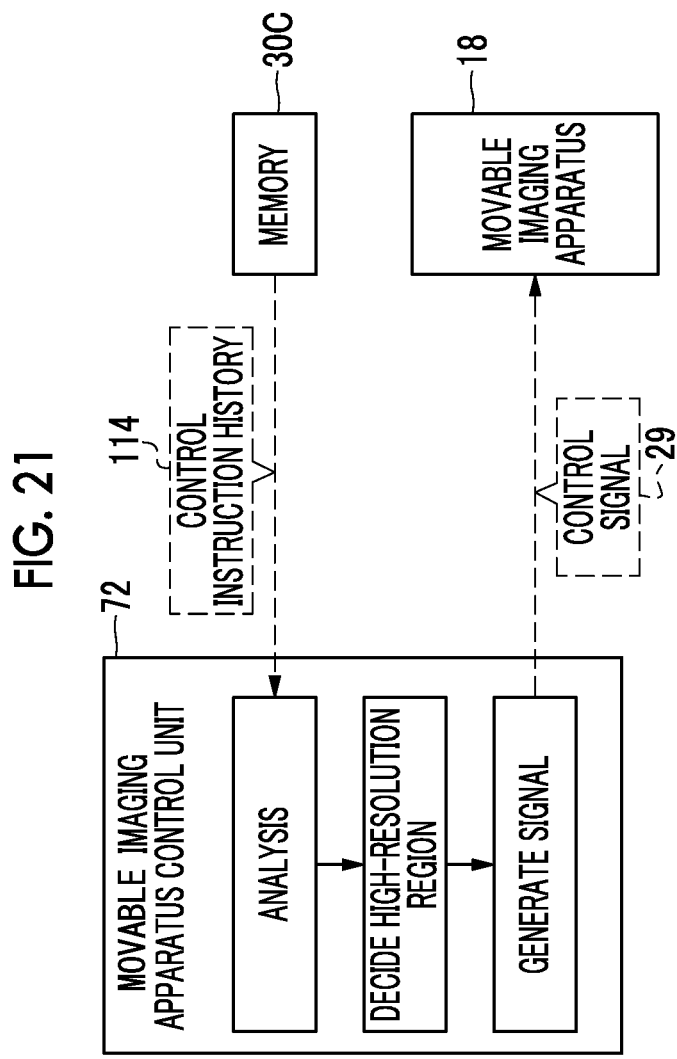
FIG. 21 is a block diagram showing an example of a function of a main part of a movable imaging apparatus control unit according to a fifth embodiment.

As shown in FIG. 21 as an example, in the fifth embodiment, a control instruction history 114, which is the history of the control instruction 76 related to the high-resolution region 75 (see FIGS. 5 and 13), is stored in the memory 30C. The control instruction history 114 is, for example, the history of the control instruction 76 received by the movable imaging apparatus control unit 72 for a predetermined time (for example, for 90 minutes). Alternatively, the control instruction history 114 may be a history of the control instruction 76 from the start to the end of the movable imaging apparatus control processing shown in FIG. 11. In addition, in a case in which there are the plurality of users of the information processing apparatus 12, the control instruction history 114 may be the history of the control instruction 76 for each user. It should be noted that the control instruction history 114 is an example of a "history" according to the technology of the present disclosure.

The movable imaging apparatus control unit 72 reads out the control instruction history 114 from the memory 30C and analyzes the high-resolution region 75 included in the read out control instruction history 114. For example, the movable imaging apparatus control unit 72 detects the specific object 102 included in the high-resolution region 75 at the highest frequency, and decides a region including the detected specific object 102 in the high-resolution region 75. Alternatively, the movable imaging apparatus control unit 72 may statistically process the high-resolution region 75 included in the control instruction history 114 to decide a region of which the frequency of becoming the high-resolution region 75 is higher than the predetermined value among the real space regions in the soccer stadium 22 in the high-resolution region 75. The movable imaging apparatus control unit 72 generates the control signal 29 for the movable imaging apparatus 18 based on the decided high-resolution region 75.

As described above, in the fifth embodiment, the movable imaging apparatus control unit 72 decides the high-resolution region 75 based on the history of the control instruction 76 related to the high-resolution region 75, and generates the control signal 29 for the movable imaging apparatus 18 based on the decided high-resolution region 75. Therefore, with the present configuration, as compared with a case in which the high-resolution region 75 is decided based on one control instruction 76, it is possible to decide the high-resolution region 75 to which the control instruction history 114 is reflected.

Sixth Embodiment

In the first embodiment, the aspect example is described in which the movable imaging apparatus control unit 72 derives the high-resolution region 75 based on the second captured image 19 acquired from the movable imaging apparatus 18. In the sixth embodiment, the movable imaging apparatus control unit 72 predicts the high-resolution region 75 based on the position, the imaging direction, and the focal length of the movable imaging apparatus 18, and outputs the predicted high-resolution region 75 to the display 34. The display 34 displays the high-resolution region 75 input from the movable imaging apparatus control unit 72.

Figure 22:
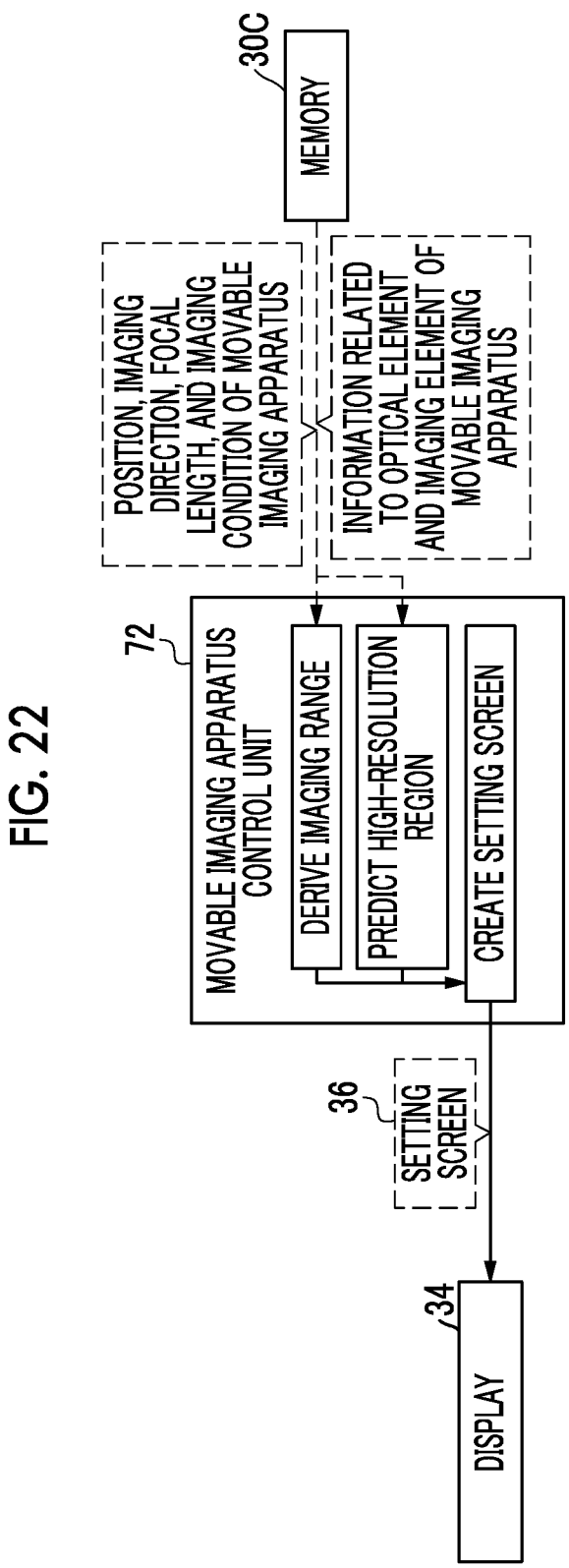
FIG. 22 is a block diagram showing an example of a function of a main part of a movable imaging apparatus control unit according to a sixth embodiment.

As shown in FIG. 22 as an example, the movable imaging apparatus control unit 72 reads out the position, the imaging direction, the focal length, and the imaging condition of each movable imaging apparatus 18 from the memory 30C. In addition, the movable imaging apparatus control unit 72 reads out information related to the lens and the imaging element 69 of each movable imaging apparatus 18 from the memory 30C. The movable imaging apparatus control unit 72 derives the imaging range 71 of each movable imaging apparatus 18 based on the position, the imaging direction, and the angle of view of each movable imaging apparatus 18. A method of deriving the imaging range 71 of each movable imaging apparatus 18 is the same as that of the first embodiment, and thus the description thereof will be omitted here.

The movable imaging apparatus control unit 72 predicts the high-resolution region 75. For example, the movable imaging apparatus control unit 72 derives a depth of field for each movable imaging apparatus 18 based on the imaging condition and the information related to the lens and the imaging element 69. The movable imaging apparatus control unit 72 acquires the three-dimensional coordinates indicating an in-focus region in which an in-focus image is obtained by each movable imaging apparatus 18 among the real space regions in the soccer stadium 22 based on the position, the imaging direction, and the depth of field of each movable imaging apparatus 18. The movable imaging apparatus control unit 72 acquires the logical sum of the three-dimensional coordinates indicating the in-focus regions of all the movable imaging apparatuses 18 as the high-resolution region 75.

The movable imaging apparatus control unit 72 creates the setting screen 36 by using the derived imaging range 71 of each movable imaging apparatus 18 and the predicted high-resolution region 75. The movable imaging apparatus control unit 72 performs control of displaying the created setting screen 36 on the display 34 (for example, see FIG. 7).

Figure 23:
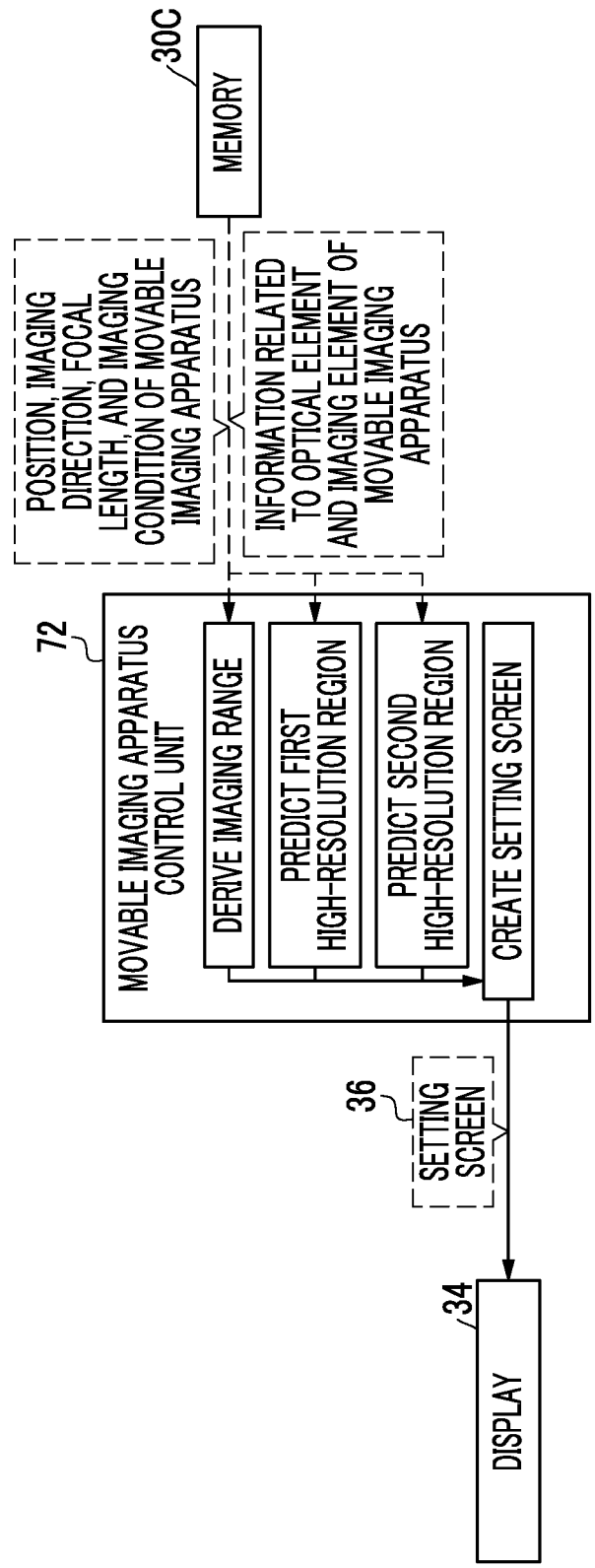
FIG. 23 is a block diagram showing another example of the function of the main part of the movable imaging apparatus control unit according to the sixth embodiment.

In addition, as shown in FIG. 23 as an example, the movable imaging apparatus control unit 72 may predict a first high-resolution region based on the current focal length of the movable imaging apparatus 18 and a second high-resolution region realized by changing the focal length of the movable imaging apparatus 18. For example, in a case in which the focal length of the movable imaging apparatus 18 is made longer than the current focal length, the imaging range 71 of the movable imaging apparatus 18 is narrowed, and the second high-resolution region narrower than the first high-resolution region is expected. Further, the resolution of the virtual viewpoint image 80 showing the subject included in the second high-resolution region is higher than the resolution of the virtual viewpoint image 80 showing the subject included in the first high-resolution region. The movable imaging apparatus control unit 72 creates the setting screen 36 from the imaging range 71 of each movable imaging apparatus 18 and the predicted first and second high-resolution regions. The movable imaging apparatus control unit 72 displays the created setting screen 36 on the display 34.

Figure 24:
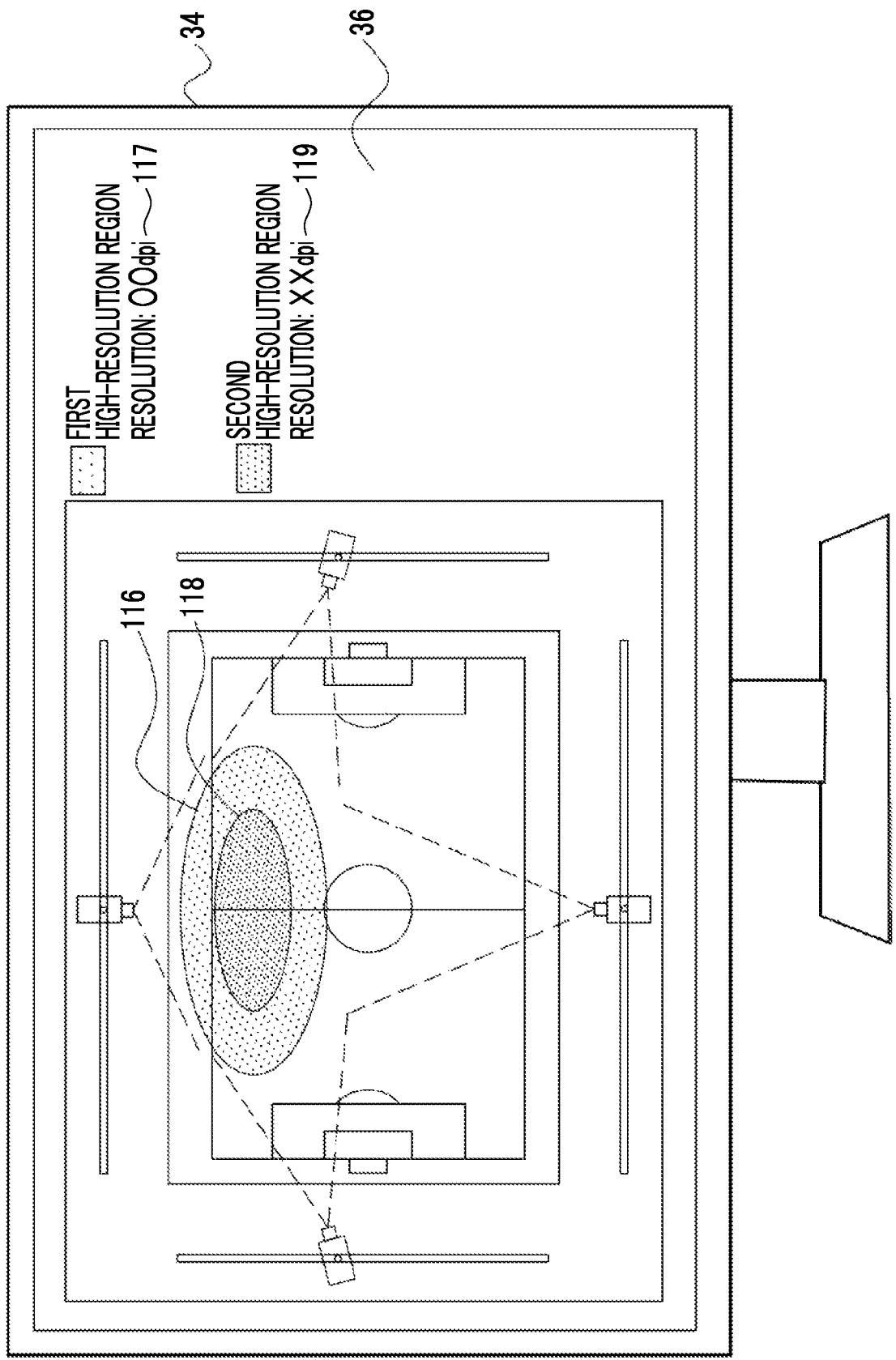
FIG. 24 is a conceptual diagram showing an example of a setting screen according to the sixth embodiment.

As shown in FIG. 24 as an example, the movable imaging apparatus control unit 72 performs control of displaying a relationship between the resolution of the high-resolution virtual viewpoint image 80B that is changed with a change of the focal length of the movable imaging apparatus 18 in the predicted first and second high-resolution regions and the sizes of the first high-resolution region and the second high-resolution region on the display 34 in a visually distinguishable manner.

On the setting screen 36, a first high-resolution region image 116 showing the first high-resolution region and a second high-resolution region image 118 showing the second high-resolution region are displayed on the display 34 in a color-divided manner, for example. On a right side of the setting screen 36, a resolution 117 of the high-resolution virtual viewpoint image 80B acquired in a case of realizing a first resolution region and a resolution 119 of the high-resolution virtual viewpoint image 80B acquired in a case of realizing a second resolution region are displayed. The resolution 119 is a value higher than the resolution 117.

Figure 25:
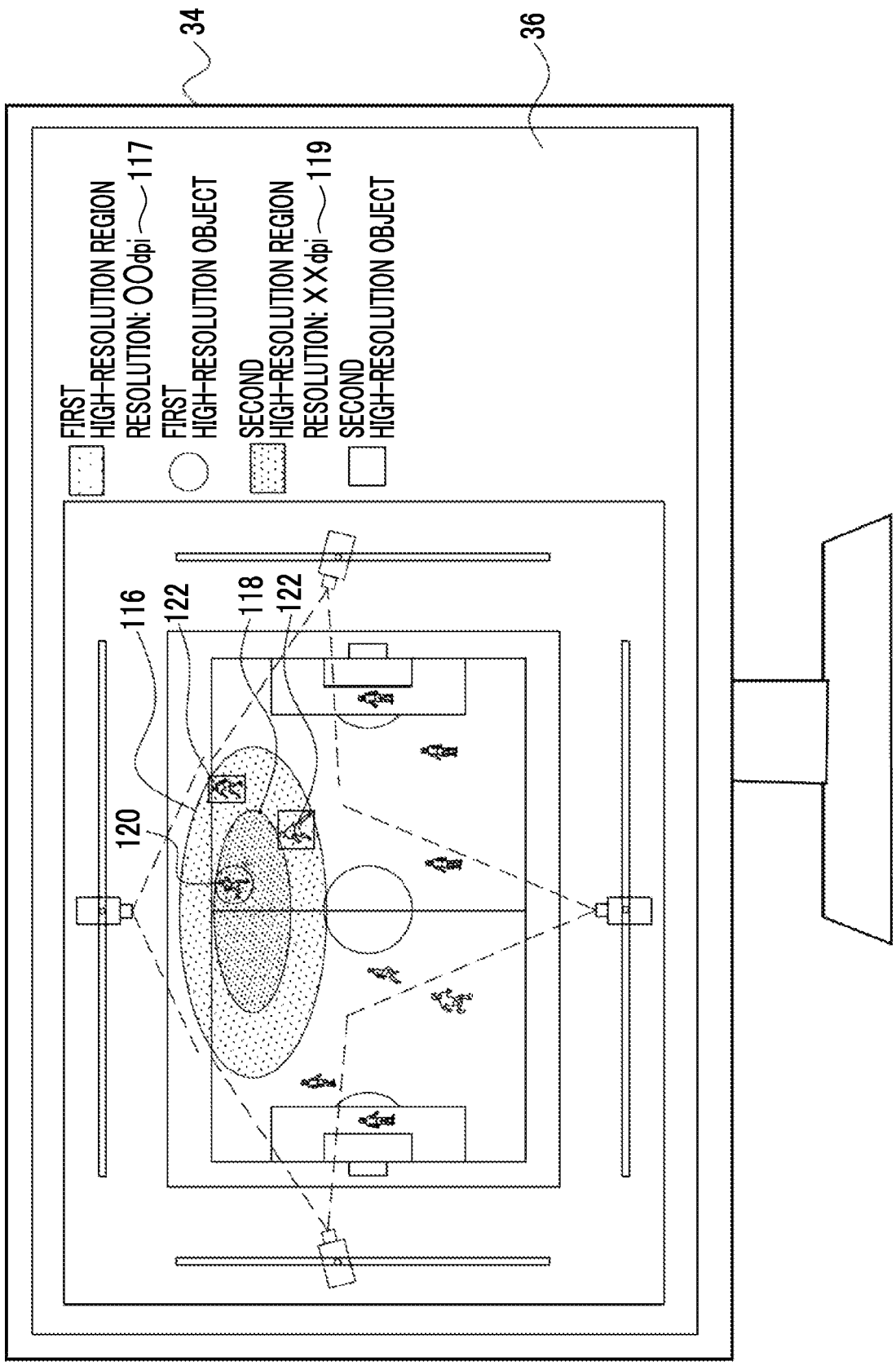
FIG. 25 is a conceptual diagram showing another example of the setting screen according to the sixth embodiment.

As shown in FIG. 25 as an example, the movable imaging apparatus control unit 72 performs control of displaying the predicted objects included in the first and second high-resolution regions on the display 34 in a visually distinguishable manner from other objects. In the example shown in FIG. 25, a first high-resolution object 120, which is the object included in the first high-resolution region, is surrounded by a circular frame and displayed on the display 34. A second high-resolution object 122, which is the object included in the second high-resolution region, is surrounded by a rectangular frame and displayed on the display 34. It should be noted that the first and second high-resolution objects 120 and 122 are examples of "an object included in the predicted high-resolution region" according to the technology of the present disclosure.

As described above, in the sixth embodiment, the movable imaging apparatus control unit 72 predicts the high-resolution region 75 in which the high-resolution virtual viewpoint image 80B can be generated among the real space regions that can be imaged by the plurality of movable imaging apparatuses 18 based on the position, the imaging direction, and the focal length of the movable imaging apparatus 18, and outputs the predicted high-resolution region 75. Therefore, with the present configuration, as compared with a case in which the high-resolution region 75 is derived from the second captured image 19 acquired by the movable imaging apparatus 18, a processing load of the movable imaging apparatus control unit 72 is reduced.

In addition, in the sixth embodiment, an output destination of the predicted high-resolution region 75 is the display 34, and the display 34 displays the high-resolution region 75 input from the movable imaging apparatus control unit 72. Therefore, with the present configuration, it is possible for the user to visually recognize the high-resolution region 75 via the display 34.

Further, in the sixth embodiment, the movable imaging apparatus control unit 72 performs the control of displaying the relationship between the resolution of the high-resolution virtual viewpoint image 80B that is changed with the change of the focal length in the predicted first and second high-resolution regions and the sizes of the first and second high-resolution regions on the display 34 in a visually distinguishable manner. Therefore, with the present configuration, as compared with a case in which the relationship between the resolution of the high-resolution virtual viewpoint image 80B and the sizes of the first and second high-resolution regions is not displayed, it is possible for the user to easily designate the high-resolution region for generating the high-resolution virtual viewpoint image 80B having a desired resolution.

In addition, in the sixth embodiment, the movable imaging apparatus control unit 72 performs the control of displaying the predicted objects included in the first and second high-resolution regions on the display 34 in a visually distinguishable manner from other objects. Therefore, with the present configuration, as compared with a case in which the objects included in the first and second high-resolution regions are not displayed in a visually distinguishable manner from the other objects, it is possible for the user to easily designate the high-resolution region for generating the high-resolution virtual viewpoint image 80B related to a desired object.

It should be noted that, in the sixth embodiment, the object included in the first high-resolution region is surrounded by the circular frame, the object included in the second high-resolution region is surrounded by the rectangular frame, and the objects are displayed on the display 34. However, the technology of the present disclosure is not limited to this. For example, for the object included in the first high-resolution region and the object included in the second high-resolution region, the objects may be colored and displayed in different colors, or the outlines of the objects may be enhanced and displayed in different colors.

Seventh Embodiment

In the seventh embodiment, the movable imaging apparatus control unit 72 performs calibration processing of calibrating the position, the imaging direction, and the focal length of each movable imaging apparatus 18 in a case of generating the control signal 29. It should be noted that, in the seventh embodiment, the same components as the components described in the first to sixth embodiments will be represented by the same reference numerals, and the description thereof will be omitted.

In the seventh embodiment, in a case in which a calibration instruction is received from the reception device 32, the movable imaging apparatus control unit 72 moves the movable imaging apparatus 18 to the reference position, the reference imaging direction, and the reference focal length. The reference position is the center of each slide bar 82 (see FIG. 5). In addition, the reference imaging direction is the direction perpendicular to each slide bar 82 (see FIG. 5). The reference focal length is the focal length predetermined for each movable imaging apparatus 18.

Figure 26:
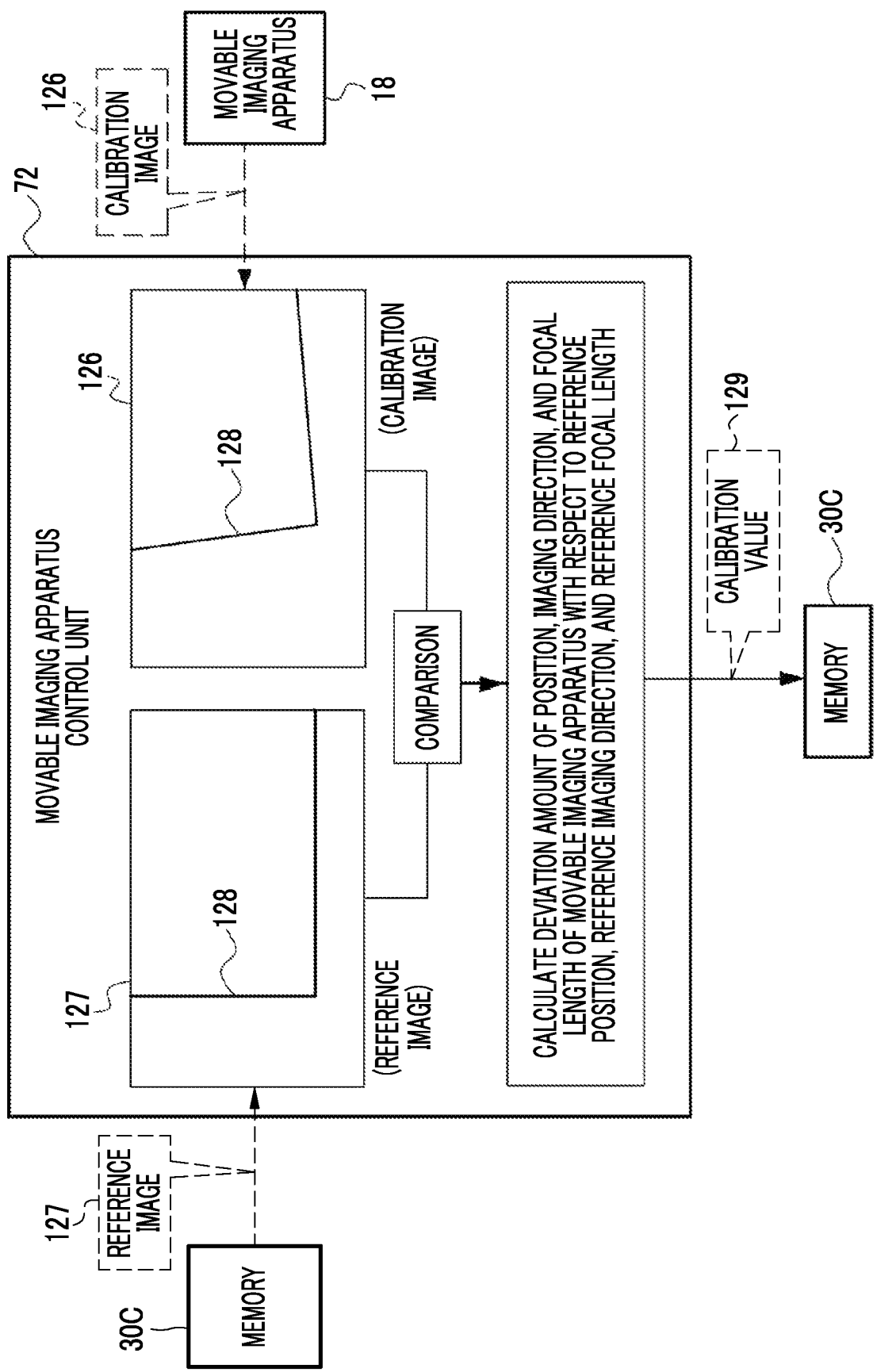
FIG. 26 is an explanatory diagram showing an example of a function of a main part of a movable imaging apparatus control unit according to a seventh embodiment.

As shown in FIG. 26 as an example, after the movement, each movable imaging apparatus 18 acquires a calibration image 126 by imaging a fixed object, for example, a line 128, included in the real space region in the soccer stadium 22. The fixed object is an object of which the position in the real space region in the soccer stadium 22 is fixed, and is a predetermined object. It should be noted that the fixed object is an example of a "fixed object" according to the technology of the present disclosure. In addition, the reference position, the reference imaging direction, and the reference focal length are examples of a "reference position", a "reference imaging direction", and a "reference focal length" according to the technology of the present disclosure. In addition, the calibration image 126 is an example of a "calibration image" according to the technology of the present disclosure.

The movable imaging apparatus control unit 72 acquires the calibration image 126 from each movable imaging apparatus 18, and acquires the reference image 127 from the memory 30C. The reference image 127 is an image obtained by imaging the fixed object by the movable imaging apparatus 18 disposed at the reference position, the reference imaging direction, and the reference focal length, and is stored in the memory 30C in advance. It should be noted that the reference image 127 is an example of a "reference image" according to the technology of the present disclosure.

The movable imaging apparatus control unit 72 compares the line 128 shown in the reference image 127 with the line 128 shown in the calibration image 126. A difference in the position between the reference image 127 and the calibration image 126 represents a deviation of the position of the movable imaging apparatus 18 with respect to the reference position. A difference in the imaging direction between the reference image 127 and the calibration image 126 represents a deviation of the imaging direction of the movable imaging apparatus 18 with respect to the reference imaging direction. A difference in the angle of view between the reference image 127 and the calibration image 126 represents a deviation of the focal length of the movable imaging apparatus 18 with respect to the reference focal length.

As causes of the deviations in the position, the imaging direction, and the focal length of the movable imaging apparatus 18, for example, an attachment error in a case in which the movable imaging apparatus 18 is attached to the imaging apparatus slide mechanism 95A, an attachment error in a case in which the revolution table 84 is attached to the revolution mechanism 95B, and an attachment error in a case in which the focus lens 66 is attached to the lens slide mechanism 95C can be considered. In addition, in a case in which the movable imaging apparatus 18 is installed outdoors, an external force due to wind, rain, sunshine, or the like can be considered.

The movable imaging apparatus control unit 72 calculates a calibration value 129 for each of the position, the imaging direction, and the focal length based on the deviations in the position, the imaging direction, and the focal length between the calibration image 126 and the reference image 127. The movable imaging apparatus control unit 72 stores the calculated calibration value 129 in the memory 30C.

Figure 27:
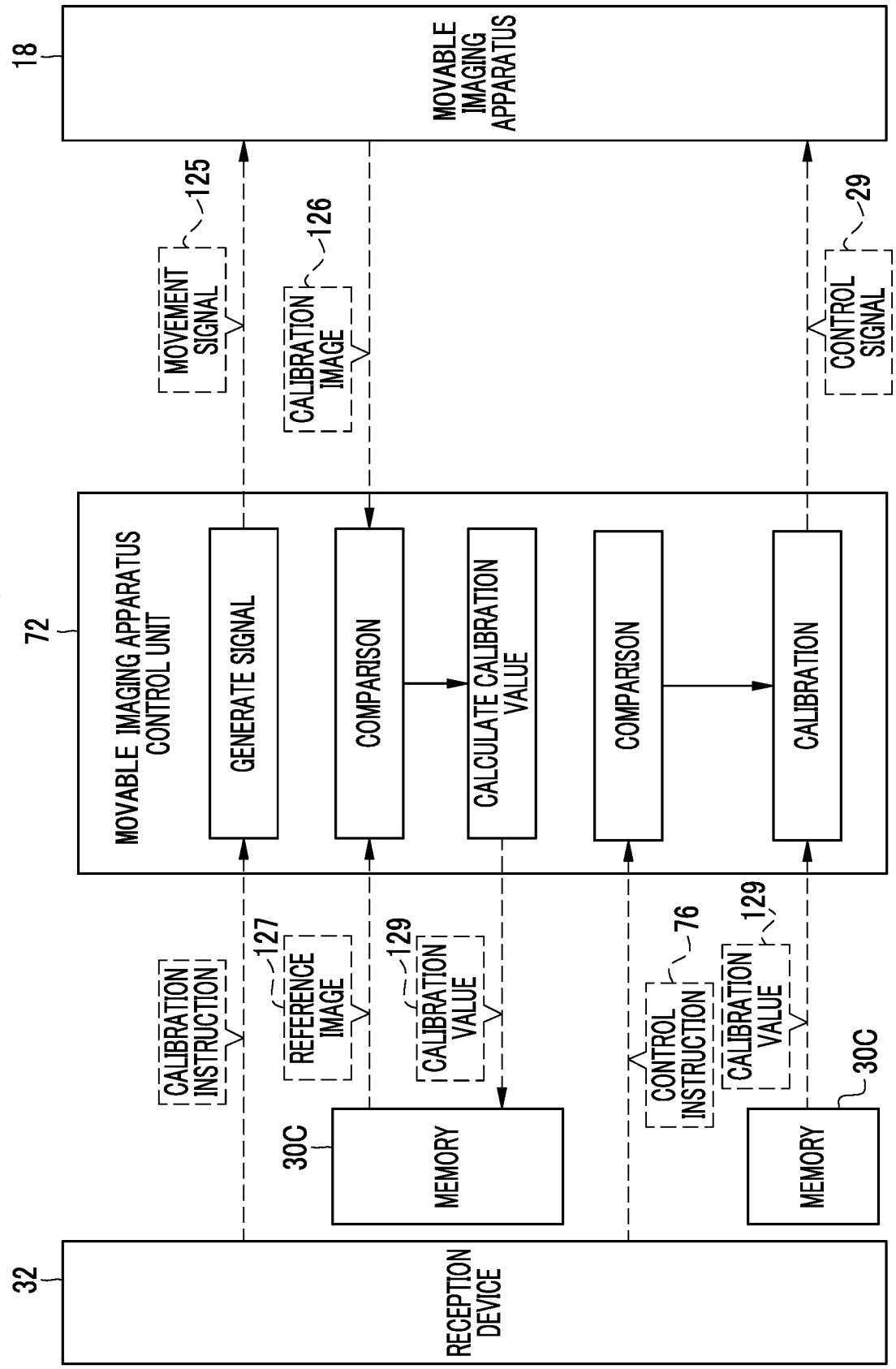
FIG. 27 is a block diagram showing an example of the function of the main part of the movable imaging apparatus control unit according to the seventh embodiment.

As shown in FIG. 27 as an example, in a case in which the calibration instruction is received from the reception device 32, the movable imaging apparatus control unit 72 transmits a movement signal 125 for instructing the movable imaging apparatus 18 to be moved to the reference position, the reference imaging direction, and the reference focal length, to each movable imaging apparatus 18. Each movable imaging apparatus 18 receives the movement signal 125 and is moved to the reference position, the reference imaging direction, and the reference focal length in response to the received movement signal 125.

After the movement, each movable imaging apparatus 18 acquires the calibration image 126 by imaging the fixed object included in the real space region in the soccer stadium 22, and transmits the acquired calibration image 126 to the movable imaging apparatus control unit 72.

The movable imaging apparatus control unit 72 receives the calibration image 126 from the movable imaging apparatus 18. In addition, the movable imaging apparatus control unit 72 reads out the reference image 127 from the memory 30C. The movable imaging apparatus control unit 72 compares the received calibration image 126 with the reference image 127. The movable imaging apparatus control unit 72 calculates the calibration value 129 based on a comparison result between the calibration image 126 and the reference image 127. The calibration value 129 is a value obtained for each movable imaging apparatus 18. The movable imaging apparatus control unit 72 stores the calculated calibration value 129 in the memory 30C.

In a case in which the control instruction 76 is received from the reception device 32, the movable imaging apparatus control unit 72 generates the control signal for causing the movable imaging apparatus 18 to change the imaging range 71 based on the control instruction 76. The movable imaging apparatus control unit 72 reads out the calibration value 129 from the memory 30C. The movable imaging apparatus control unit 72 calibrates the generated control signal by using the read out calibration value 129. The movable imaging apparatus control unit 72 transmits the calibrated control signal as the control signal 29 to the movable imaging apparatus 18.

As described above, in the seventh embodiment, the movable imaging apparatus control unit 72 stores the reference image 127 in the memory 30C in advance. The movable imaging apparatus control unit 72 compares the calibration image 126 with the reference image 127, and calibrates the control signal 29 based on the comparison result. Therefore, with the present configuration, it is possible to generate the control signal 29 with higher accuracy as compared with a case in which the movable imaging apparatus control unit 72 does not perform the calibration processing.

In addition, in the embodiments described above, the soccer stadium 22 is described as an example, but it is merely an example, and any place, such as a baseball stadium, a rugby stadium, a curling stadium, an athletics stadium, a swimming pool, a concert hall, an outdoor music hall, and a theater venue, may be adopted as long as a plurality of physical cameras can be installed.

In addition, in the embodiments described above, the computer 30 is described as an example, but the technology of the present disclosure is not limited to this. For example, instead of the computer 30, a device including an ASIC, an FPGA, and/or a PLD may be applied. In addition, instead of the computer 30, a combination of a hardware configuration and a software configuration may be used.

In addition, in the embodiments described above, the form example is described in which the information processing is executed by the CPU 30A of the information processing apparatus 12, but the technology of the present disclosure is not limited to this. Instead of the CPU 30A, a GPU may be adopted or a plurality of CPUs may be adopted. In addition, various processing may be executed by one processor or a plurality of processors which are physically separated.

In addition, in the embodiment described above, the movable imaging apparatus control program 62 is stored in the storage 30B, but the technology of the present disclosure is not limited to this, and the movable imaging apparatus control program 62 may be stored in any portable storage medium 200 as shown in FIG. 28 as an example. The storage medium 200 is a non-transitory storage medium. Examples of the storage medium 200 include an SSD or a USB memory. The movable imaging apparatus control program 62 stored in the storage medium 200 is installed in the computer 30, and the CPU 30A executes the movable imaging apparatus control processing in accordance with the movable imaging apparatus control program 62.

In addition, the movable imaging apparatus control program 62 may be stored in a program memory of another computer or server device connected to the computer 30 via a communication network (not shown), and the movable imaging apparatus control program 62 may be downloaded to the information processing apparatus 12 in response to the request of the information processing apparatus 12. In this case, the movable imaging apparatus control processing based on the downloaded movable imaging apparatus control program 62 is executed by the CPU 30A of the computer 30.

The following various processors can be used as a hardware resource for executing the information processing. As described above, examples of the processor include a CPU, which is a general-purpose processor that functions as the hardware resource for executing the movable imaging apparatus control processing in accordance with software, that is, the program.

In addition, another example of the processor includes a dedicated electric circuit which is a processor having a circuit configuration specially designed for executing specific processing, such as an FPGA, a PLD, or an ASIC. A memory is built in or connected to any processor, and any processor executes the movable imaging apparatus control processing by using the memory.

The hardware resource for executing the movable imaging apparatus control processing may be configured by one of these various processors, or may be configured by a combination (for example, a combination of a plurality of FPGAs or a combination of a CPU and an FPGA) of two or more processors of the same type or different types. In addition, the hardware resource for executing the movable imaging apparatus control processing may be one processor.

As an example in which the hardware resource is configured by one processor, first, there is a form in which one processor is configured by a combination of one or more CPUs and software, and the processor functions as the hardware resource for executing the movable imaging apparatus control processing, as represented by a computer, such as a client and a server. Secondly, as represented by SoC, there is a form in which a processor that realizes the functions of the entire system including a plurality of hardware resources for executing the movable imaging apparatus control processing with one IC chip is used. As described above, the movable imaging apparatus control processing is realized by using one or more of the various processors as the hardware resources.

Further, as the hardware structures of these various processors, more specifically, it is possible to use an electric circuit in which circuit elements, such as semiconductor elements, are combined.

In addition, the information processing described above is merely an example. Therefore, it is needless to say that the deletion of an unneeded step, the addition of a new step, and the change of a processing order may be employed within a range not departing from the gist.

The described contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the described contents and shown contents above within a range that does not deviate from the gist of the technology of the present disclosure. In addition, in order to avoid complications and facilitate understanding of the parts according to the technology of the present disclosure, the description of common technical knowledge or the like, which does not particularly require the description for enabling the implementation of the technology of the present disclosure, is omitted in the described contents and the shown contents above.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:

1. An information processing apparatus comprising:
a processor capable of generating a virtual viewpoint image based on a plurality of captured images acquired by imaging with a plurality of imaging apparatuses; and
a memory built in or connected to the processor,
wherein the processor is configured to:
decide a high-resolution region based on a result of aggregating a plurality of the instructions including a plurality of specific regions given by a plurality of users, and
generate a control signal for a control target imaging apparatus among the plurality of imaging apparatuses based on at least the high-resolution region which has been decided,
wherein at least one of the plurality of instructions given from an outside regarding a generation of the virtual viewpoint image or a subject includes an instruction related to the high-resolution region which is a target for generating a high-resolution virtual viewpoint image.

2. The information processing apparatus according to claim 1,
wherein the control signal is further configured to cause the control target imaging apparatus to acquire the captured image used to generate a virtual viewpoint image satisfying a predetermined condition in response to the instruction.

3. The information processing apparatus according to claim 1,
wherein the control signal is further configured to cause the control target imaging apparatus to acquire the captured image used to generate a high-resolution virtual viewpoint image having a resolution equal to or higher than a predetermined value.

4. The information processing apparatus according to claim 3,
wherein the processor is capable of changing the resolution of the high-resolution virtual viewpoint image by changing a focal length of the control target imaging apparatus.

5. The information processing apparatus according to claim 3,
wherein the processor predicts a high-resolution region in which the high-resolution virtual viewpoint image is capable of being generated among real space regions capable of being imaged by the plurality of imaging apparatuses based on a position, an imaging direction, and a focal length of the control target imaging apparatus, and outputs the predicted high-resolution region.

6. The information processing apparatus according to claim 5,
wherein an output destination of the predicted high-resolution region is a display, and
the display displays the high-resolution region output from the processor.

7. The information processing apparatus according to claim 5,
wherein the processor performs control of displaying a relationship between the resolution of the high-resolution virtual viewpoint image which is changed with a change of the focal length in the predicted high-resolution region and a size of the high-resolution region on a display in a visually distinguishable manner.

8. The information processing apparatus according to claim 5,
wherein the processor performs control of displaying an object included in the predicted high-resolution region on a display in a visually distinguishable manner from other objects.

9. The information processing apparatus according to claim 1,
wherein the control signal is further configured to change an imaging range of the control target imaging apparatus.

10. The information processing apparatus according to claim 1,
wherein the control signal further includes a position change signal for changing a position of the control target imaging apparatus.

11. The information processing apparatus according to claim 1,
wherein the control signal further includes an imaging direction change signal for changing an imaging direction of the control target imaging apparatus.

12. The information processing apparatus according to claim 1,
wherein the control target imaging apparatus has an optical zoom function, and
the control signal further includes a focal length change signal for changing a focal length of the control target imaging apparatus.

13. The information processing apparatus according to claim 1,
wherein the control target imaging apparatus includes a change mechanism for changing a position, an imaging direction, a focal length, and an imaging condition of the control target imaging apparatus, and
the change mechanism changes at least one of the position, the imaging direction, the focal length, or the imaging condition of the control target imaging apparatus in response to the control signal.

14. The information processing apparatus according to claim 1,
wherein the processor generates the control signal for causing the control target imaging apparatus to acquire the captured image used to generate a high-resolution virtual viewpoint image of a region that is predicted to have a high gaze degree based on a state of the subject among real space regions capable of being imaged by the plurality of imaging apparatuses.

15. The information processing apparatus according to claim 1,
wherein, in a case in which information indicating a specific region among real space regions capable of being imaged by the plurality of imaging apparatuses is included in the instruction, the processor generates the control signal for causing the control target imaging apparatus to acquire the captured image used to generate a high-resolution virtual viewpoint image of the specific region.

16. The information processing apparatus according to claim 1,
wherein the high-resolution region is a region including a specific object included in real space regions capable of being imaged by the plurality of imaging apparatuses.

17. The information processing apparatus according to claim 1,
wherein the high-resolution region is a region including a path of a gaze position with respect to the virtual viewpoint image.

18. The information processing apparatus according to claim 1,
wherein the processor decides the high-resolution region based on a history of the instruction related to the high-resolution region, and generates the control signal for the control target imaging apparatus based on the decided high-resolution region.

19. The information processing apparatus according to claim 1,
wherein the processor
stores a reference image obtained by causing the control target imaging apparatus to image a fixed object included in a real space region capable of being imaged by the imaging apparatus at a reference position, a reference imaging direction, and a reference focal length in the memory in advance,
compares a calibration image obtained by causing the control target imaging apparatus to image the fixed object at the reference position, the reference imaging direction, and the reference focal length with the reference image, and
calibrates the control signal based on a comparison result.

20. An information processing system comprising:
a plurality of imaging apparatuses; and
the information processing apparatus according to claim 1.

21. An information processing method capable of generating a virtual viewpoint image based on a plurality of captured images acquired by imaging with a plurality of imaging apparatuses, the method comprising:
deciding a high-resolution region based on a result of aggregating a plurality of the instructions including a plurality of specific regions given by a plurality of users, and
generating a control signal for a control target imaging apparatus among the plurality of imaging apparatuses based on at least the high-resolution region which has been decided,
wherein at least one of the plurality of instructions given from an outside regarding a generation of the virtual viewpoint image or a subject includes an instruction related to the high-resolution region which is a target for generating a high-resolution virtual viewpoint image.

22. A non-transitory computer-readable storage medium storing a program executable by a computer to perform information processing capable of generating a virtual viewpoint image based on a plurality of captured images acquired by imaging with a plurality of imaging apparatuses, the information processing comprising:
deciding a high-resolution region based on a result of aggregating a plurality of the instructions including a plurality of specific regions given by a plurality of users, and
generating a control signal for a control target imaging apparatus among the plurality of imaging apparatuses based on at least the high-resolution region which has been decided,
wherein at least one of the plurality of instructions given from an outside regarding a generation of the virtual viewpoint image or a subject includes an instruction related to the high-resolution region which is a target for generating a high-resolution virtual viewpoint image.

* * * * *